(12) United States Patent  (10) Patent No.: US 7,398,019 B2
Tochio et al.  (45) Date of Patent: Jul. 8, 2008

(54) CONTROL APPARATUS AND CONTROL METHOD OF OPTICAL SIGNAL EXCHANGER

(75) Inventors: Yuji Tochio, Kawasaki (JP); Kazuyuki Mori, Kawasaki (JP); Tetsuji Yamabana, Kawasaki (JP); Ichiro Watanabe, Kawasaki (JP); Yuji Ishii, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 10/643,895

(22) Filed: Aug. 20, 2003

(65) Prior Publication Data

US 2004/0037490 A1  Feb. 26, 2004

(30) Foreign Application Priority Data

Aug. 22, 2002  (JP)  ............................. 2002-242290

(51) Int. Cl.
*H04J 14/00* (2006.01)
(52) U.S. Cl. .......................................... 398/56; 398/55
(58) Field of Classification Search .................. 398/55, 398/56
See application file for complete search history.

(56) References Cited

U.S. PATENT DOCUMENTS

| 6,549,691 | B1 | 4/2003 | Street et al. | |
| 6,975,785 | B2 * | 12/2005 | Ghandi et al. | ............... 385/16 |
| 2002/0109076 | A1 * | 8/2002 | Tochio et al. | ......... 250/214 SW |
| 2002/0171902 | A1 * | 11/2002 | Berhane et al. | ............. 359/230 |
| 2005/0002602 | A1 * | 1/2005 | Hatam-Tabrizi et al. | ....... 385/17 |

FOREIGN PATENT DOCUMENTS

| JP | 05-210419 | 8/1993 |
| JP | 05-285786 | 11/1993 |
| JP | 08-126370 | 5/1996 |
| JP | 08-149876 | 6/1996 |
| JP | 09-0514483 | 2/1997 |
| JP | 2002-162575 | 6/2002 |
| JP | 2002-236264 | 8/2002 |

* cited by examiner

*Primary Examiner*—Jason Chan
*Assistant Examiner*—Nathan M Curs
(74) *Attorney, Agent, or Firm*—Staas & Halsey LLP

(57) ABSTRACT

An object of the invention is to provide a control apparatus and a control method having a simple constitution, which can stably perform switching of optical path in an optical signal exchanger, while suppressing an influence on a control due to the mechanical resonance of tilt mirrors. To this end, the control apparatus of the optical signal exchanger is constituted such that in an optical signal exchanger of three-dimensional type using one set of MEMS mirror arrays, each having a plurality of tilt mirrors arranged on a plane, each tilt mirror having a reflecting surface an angle of which is controllable, when the angle of the MEMS mirror on the optical path is feedback controlled by detecting power of an optical signal output from a specific position, a resonance component removing section that removes a resonance frequency component included in a control signal is shared corresponding to a pair of driving electrodes arranged in a coaxial direction of the MEMS mirror. As a result, the influence on the feedback control by a resonance action of the MEMS mirror can be reduced, while suppressing an increase in circuit size.

22 Claims, 20 Drawing Sheets

CONTROL APPARATUS ACCORDING TO FIRST EMBODIMENT OF PRESENT INVENTION

MAIN CONFIGURATION OF CONTROL APPARATUS ACCORDING TO SECOND EMBODIMENT OF PRESENT INVENTION

MAIN CONFIGURATION OF CONTROL APPARATUS ACCORDING TO THIRD EMBODIMENT OF PRESENT INVENTION

APPLICATION EXAMPLE OF FOURTH EMBODIMENT

EXAMPLE OF DRIVING WAVEFORM AT TIME OF SWITCHING
DRIVER IN FIRST TO FIFTH EMBODIMENTS OF PRESENT INVENTION

EXAMPLE OF DRIVING WAVEFORM AT TIME OF SWITCHING
DRIVER IN SIXTH EMBODIMENT OF PRESENT INVENTION

CONTROL FLOW IN SIXTH EMBODIMENT
OF PRESENT INVENTION

EXAMPLE OF DRIVING WAVEFORM WHEN SWITCHING OF DRIVER IS NOT NECESSARY

MAIN CONFIGURATION OF CONTROL APPARATUS
ACCORDING TO SEVENTH EMBODIMENT OF PRESENT INVENTION

MAIN CONFIGURATION OF RESONANCE COMPONENT REMOVING
SECTION IN EIGHTH EMBODIMENT OF PRESENT INVENTION

FREQUENCY

RESPONSE CHARACTERISTIC OF DRIVER

RESPONSE CHARACTERISTIC WHEN TRANSFER FUNCTIONS
OF MEMS MIRROR AND DIGITAL FILTER ARE COMBINED

APPLICATION EXAMPLE IN EIGHTH EMBODIMENT OF PRESENT INVENTION

OTHER APPLICATION EXAMPLE IN EIGHTH EMBODIMENT
OF PRESENT INVENTION

CONFIGURATION EXAMPLE OF TYPICAL OPTICAL SIGNAL EXCHANGER OF THREE-DIMENSIONAL TYPE

CONFIGURATION EXAMPLE OF CONVENTIONAL CONTROL APPARATUS
FOR REDUCING OPTICAL LOSS TO MINIMUM

SPECIFIC EXAMPLE OF CONVENTIONAL CONTROL APPARATUS

DRIVING STATE OF TYPICAL MEMS MIRROR

CONTROL APPARATUS AND CONTROL METHOD OF OPTICAL SIGNAL EXCHANGER

BACKGROUND OF THE INVENTION

1. Field of the Invention

The present invention relates to a switching control technique for an optical signal exchanger, and in particular relates to a control apparatus and a control method of an optical signal exchanger that uses a reflecting tilt mirror made by micromachining (MEMS: Micro Electric Mechanical System) technology.

2. Description of the Related Art

Recently, with the increase in traffic on the Internet and the like, a demand for optical networks is increasing. Under such circumstances, attention is being paid to the introduction of optical signal exchangers that switch data of high speed and high volume just as in an optical signal state. As a conventional technique for realizing a high speed and high capacity optical signal exchanger, for example a system mechanically switching an optical fiber or a system constituted by combining waveguides, has been predominant. However, in this conventional technique, it is necessary to adopt a multistage constitution. Therefore, an optical loss inside the optical signal exchanger is very significant, and further, there is also a limit to deal with an increase in the number of channels. Consequently, it is difficult to realize an optical signal exchanger that deals with several 10 channels or more.

Under the abovementioned circumstances, an optical switch using a tilt mirror (hereunder referred to as an MEMS mirror) made by applying micromachining (MEMS) technology is predominant compared to other switches, from the point of miniaturization, wavelength independence and polarization independence, and is thus gaining attention. In particular, for example as shown in FIG. 23, an optical signal exchanger of three-dimensional type constituted by combining two collimator arrays 1A and 1B having a plurality of collimators arranged in two dimensions, respectively, and two MEMS mirror arrays 2A and 2B having a plurality of MEMS mirrors arranged in two dimensions, respectively, is expected from the point that a reduction in optical loss, a large capacity and multichannel can be realized.

Regarding the abovementioned three-dimensional optical signal exchanger, the present applicant has proposed a control technique for automatically correcting angular displacement of respective MEMS mirrors to reduce an optical loss (Japanese Unexamined Patent Publication No. 2002-236264 and Japanese Patent Application No. 2002-132833). A control apparatus for an optical signal exchanger applied with this control technique, for example as shown in FIG. 24, automatically corrects the angular displacement of reflecting surfaces of respective MEMS mirrors by; detecting in an optical power detection section 12, power of light branched by an optical coupler array 11 provided on a latter stage of an output optical fiber array 10B connected to a collimator 1B on an output side, judges in a comparison control section 13 based on the detection results, coupling states of optical signals with respect to output optical fibers, and controlling respective MEMS mirror drive sections 14A and 14B so that the loss inside the optical signal exchanger become minimum.

The optical switch using the MEMS mirror in the abovementioned optical signal exchanger include an intrinsic problem in that since the switch element itself mechanically operates, when the angle is controlled at a high speed, mechanical resonance of the MEMS mirrors occurs, thereby affecting the feedback control of the angle.

A mechanical characteristic of the MEMS mirror can be generally expressed by the following equation (1):

$$G_{MEMS}(s) = \frac{\omega_{MEMS}^2}{s^2 + 2 \cdot \xi_{MEMS} \cdot \omega_{MEMS} \cdot s + \omega_{MEMS}^2} \quad (1)$$

where $\omega_{MEMS}$ is a resonance frequency of the MEMS mirror, $\xi_{MEMS}$ is a damping factor, and s is a Laplacian operator. The damping factor $\xi_{MEMS}$ has a value of about from 0.001 to 0.01, although this depends on the process structure of the MEMS mirror.

FIG. 25 is a diagram showing one example of a specific configuration of the conventional control apparatus shown in FIG. 24 mentioned above. FIG. 26 is a diagram schematically showing the driven state of a typical MEMS mirror.

As shown in the respective figures, each MEMS mirror arranged on the MEMS mirror array comprises electrodes 2X-1 and 2X-2, 2Y-1 and 2Y-2 in the vicinity of the opposite ends of a mirror 2a, for each direction of the X axis and the Y axis. A voltage is applied to the electrode affiliated with the direction in which the mirror 2a is to be tilted (for example, in FIG. 26, the electrode 2X-1), in accordance with a control signal from the comparison control section 13, to electrostatically actuate the electrode, thereby tilting the reflecting surface of the mirror 2a in the required direction. At this time, the electrostatically actuated MEMS mirror follows the mechanical characteristic shown in equation (1), and hence resonance may occur, for example, as shown in FIG. 27. In the conventional control apparatus, the driven state of the resonance acting MEMS mirrors is feedback controlled so that an angle of the reflecting surface is optimized, based on the detection result in an optical power detection section 12. Therefore, there is a possibility that the feedback control cannot be accurately carried out due to an influence of the resonance action.

In order to reduce the influence on the feedback control due to the resonance action of the MEMS mirror, for example, it can be considered to insert in a control loop, a filter for removing resonance frequency components included in the control signal. Such a method is well known in Japanese Unexamined Patent Publication Nos. 8-126370, 5-210419, 5-285786 and 8-149876, though these publications are in different fields to the control of the optical signal exchanger.

However, taking into consideration actual implementation of the filter in the conventional control apparatus of the optical signal exchanger of the three-dimensional type, four filters are required for one MEMS mirror, as shown in FIG. 25. Since these four filters are necessary for each one of MEMS mirrors arranged in the respective MEMS mirror arrays 2A and 2B on an input side and on an output side, there is a problem in that the circuit size is increased.

SUMMARY OF THE INVENTION

The present invention has been accomplished in view of the abovementioned points, and has an object of providing a control apparatus and a control method having a simple construction capable to stably perform switching of an optical path in an optical signal exchanger, while suppressing an influence on a control by mechanical resonance of tilt mirrors.

In order to achieve the abovementioned object, according to the present invention, there is provided a control apparatus of an optical signal exchanger which includes a first mirror array and a second mirror array, each having a plurality of tilt mirrors arranged on a plane, each tilt mirror having a reflecting surface an angle of which is controllable, and which sequentially reflects an input optical signal by the first and second mirror arrays to output from a specific position, for detecting power of an optical signal output from the specific position, and feedback controlling the angle of at least one of the reflecting surfaces of the tilt mirrors, which have reflected the optical signal on the first and second mirror arrays, based on the detection result, wherein the control apparatus comprises a resonance component removing section that removes frequency components corresponding to mechanical resonance actions of the tilt mirrors, included in control signals used for the feedback control, and the resonance component removing section is at least shared corresponding to a pair of driving electrodes arranged in a coaxial direction of the tilt mirrors.

In the control apparatus having such a construction, in the drive control of the tilt mirrors, taking into consideration that the mirror angle is tilted by applying a drive voltage to only one of the pair of driving electrodes existing in the coaxial direction of each tilt mirror, the resonance frequency component included in the control signal is removed by the resonance component removing section, which is at least shared corresponding to the pair of driving electrodes arranged in the coaxial direction of each tilt mirror on the first and second mirror arrays. As a result, an influence on the feedback control by the resonance action of the tilt mirrors can be reduced, while suppressing an increase of the circuit size.

Other objects, characteristics and advantages of the present invention will become apparent from the following description of embodiments, in conjunction with the appended drawings.

DETAILED DESCRIPTION OF THE INVENTION

Hereunder is a description of embodiments of the present invention, based on the drawings.

Figure 1:
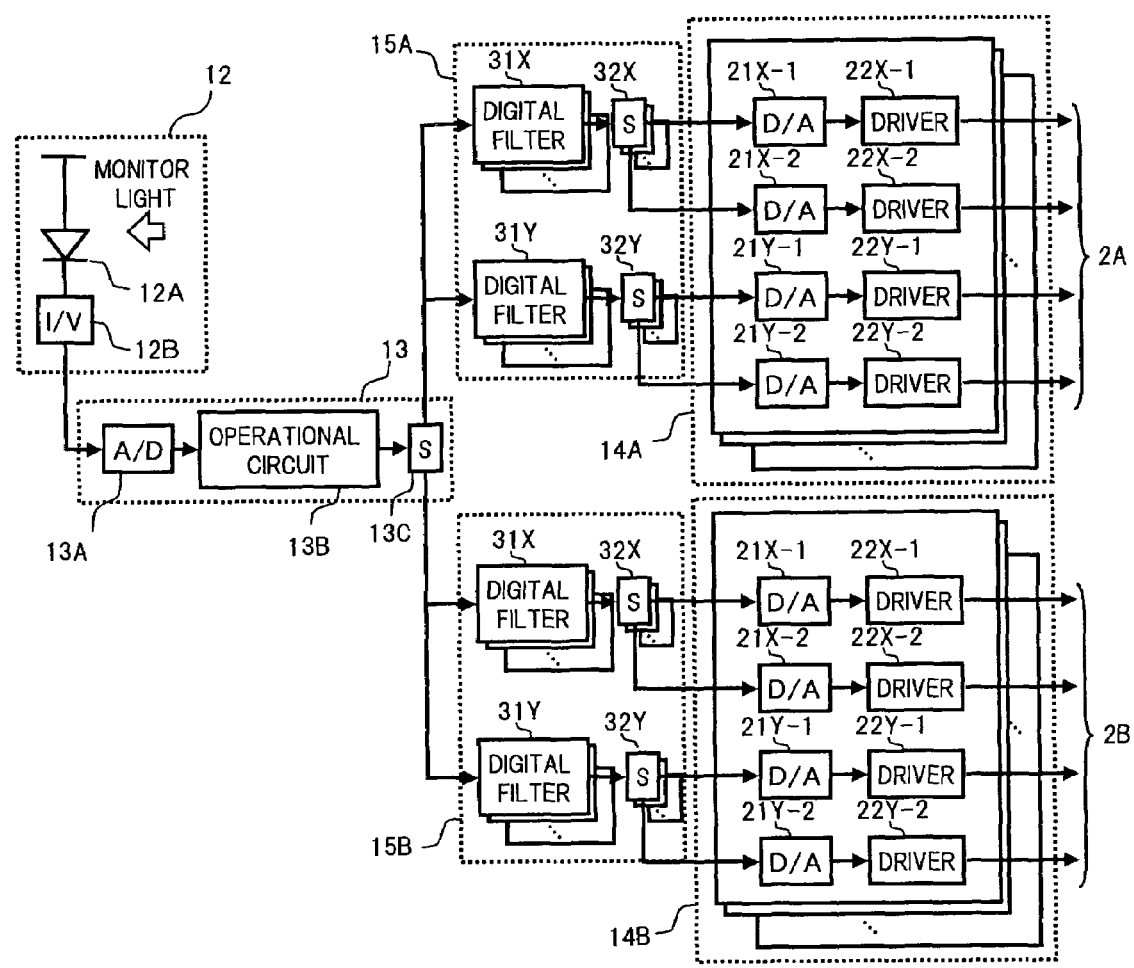
FIG. 1 is a block diagram showing a constitution of a control apparatus of an optical signal exchanger according to a first embodiment of the present invention.
Figure 2:
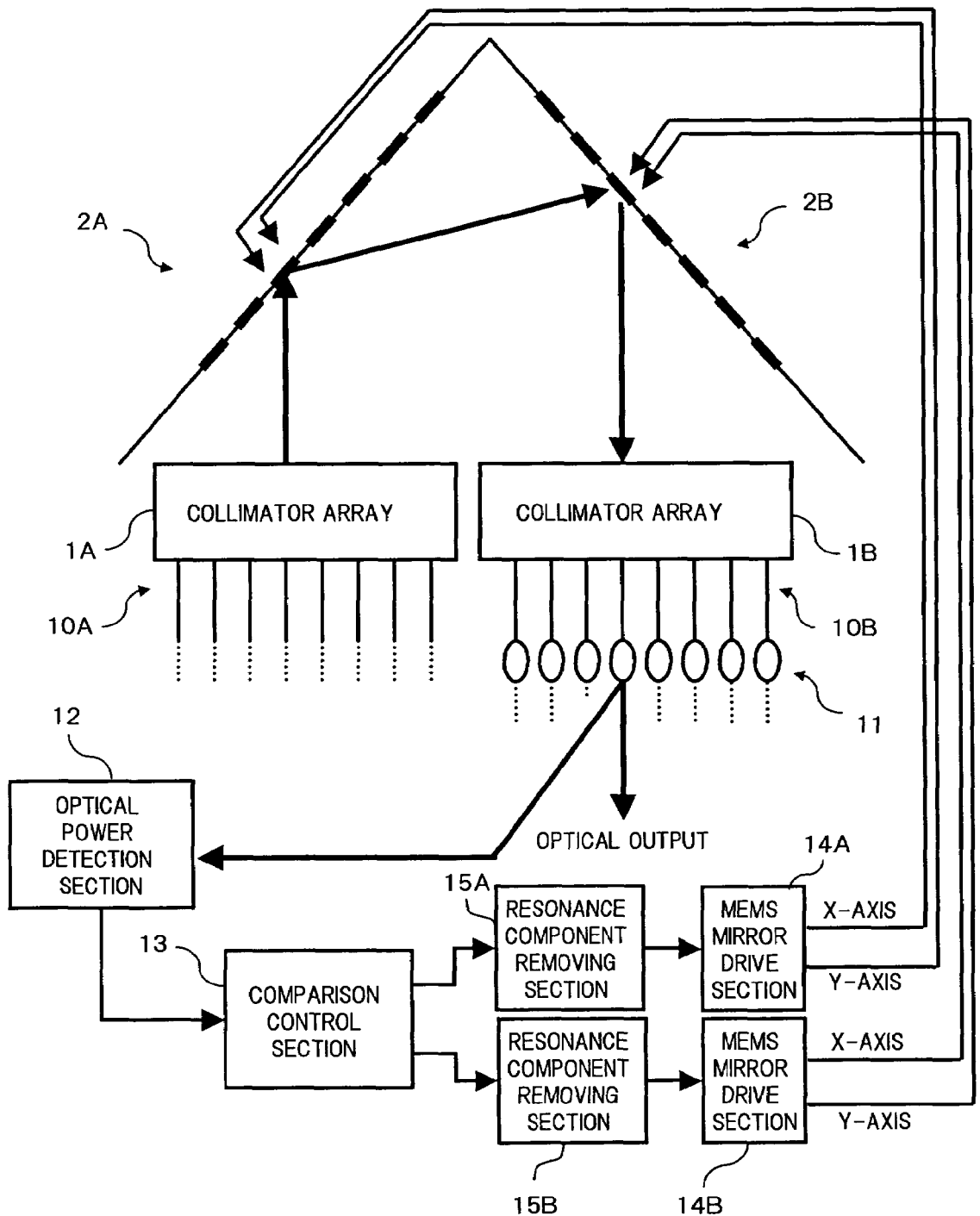
FIG. 2 is a schematic diagram showing an overall configuration of an optical signal exchanger to which the control apparatus of FIG. 1 is applied.

FIG. 1 is a functional block diagram showing a constitution of a control apparatus of an optical signal exchanger according to a first embodiment of the present invention. Further, FIG. 2 is a schematic diagram showing an overall configuration of an optical signal exchanger to which the control apparatus of FIG. 1 is applied. Components the same as those in the conventional constitution shown in FIG. 25 are denoted by the same reference symbol.

Figure 25:
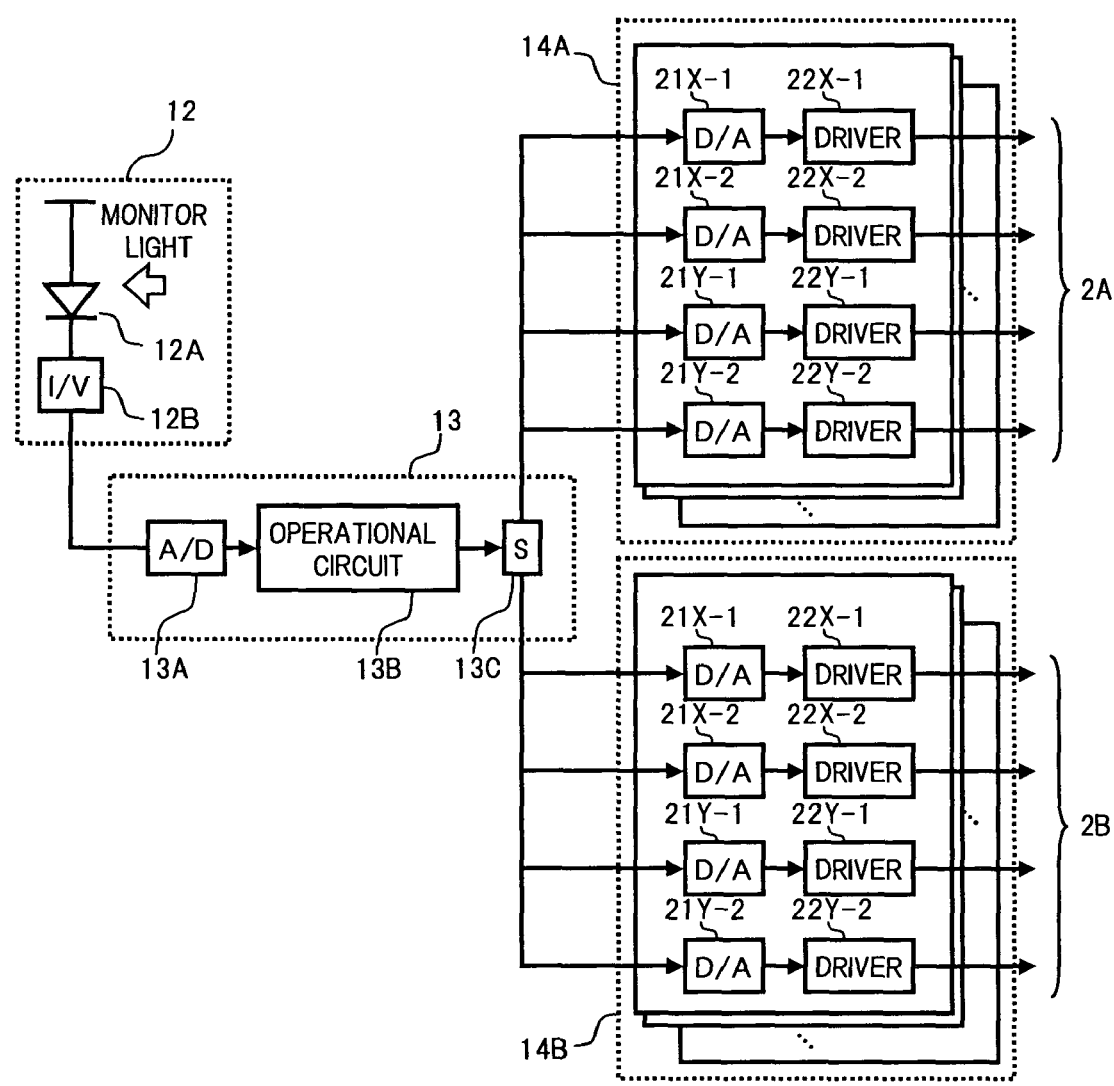
FIG. 25 is a diagram showing one example of a specific configuration of the conventional control apparatus shown in FIG. 24.

In the figures, an overall configuration of this embodiment is one where, for example as with the conventional constitution shown in FIG. 25, in an optical signal exchanger of three-dimensional type constituted by combining two collimator arrays 1A and 1B having a plurality of collimators arranged in two dimensions, respectively, and two MEMS mirror arrays 2A and 2B having a plurality of MEMS mirrors arranged in two dimensions corresponding to the collimators of the collimator arrays 1A and 1B, respectively, there is provided a control apparatus comprising: an optical coupler array 11 provided at a latter stage of an output optical fiber array 10B connected to the collimator array 1B on an output side; an optical power detection section 12 that detects power of light branched by each optical coupler of the optical coupler array 11; a comparison control section 13 that judges a coupling state of an optical signal with respect to an output optical fiber based on the detection result of the optical power detection section 12, to control respective MEMS mirror drive sections 14A and 14B so that an optical output level becomes a constant; and resonance component removing sections 15A and 15B that remove frequency components corresponding to the mechanical resonance action of the MEMS mirrors, from control signals which are respectively fed back from the comparison control section 13 to the MEMS mirror drive sections 14A and 14B.

Here, the MEMS mirror array 2A corresponds to a first mirror array, the MEMS mirror array 2B corresponds to a second mirror array, the MEMS mirror drive section 14A corresponds to a first mirror drive section, and the MEMS mirror drive section 14B corresponds to a second mirror drive section.

The collimator array 1A of the optical signal exchanger is connected with an input optical fiber array 10A having a plurality of optical fibers arranged in two dimensions corresponding to the respective collimators, and light emitted from each input optical fiber passes through each collimator to become parallel light, to be sent towards the MEMS mirror array 2A. Further, the collimator array 1B is connected with an output optical fiber array 10B having a plurality of optical fibers arranged in two dimensions corresponding to the respective collimators, and light reflected by the MEMS mirror array 2B passes through each collimators to be coupled to each output optical fibers.

Figure 26:
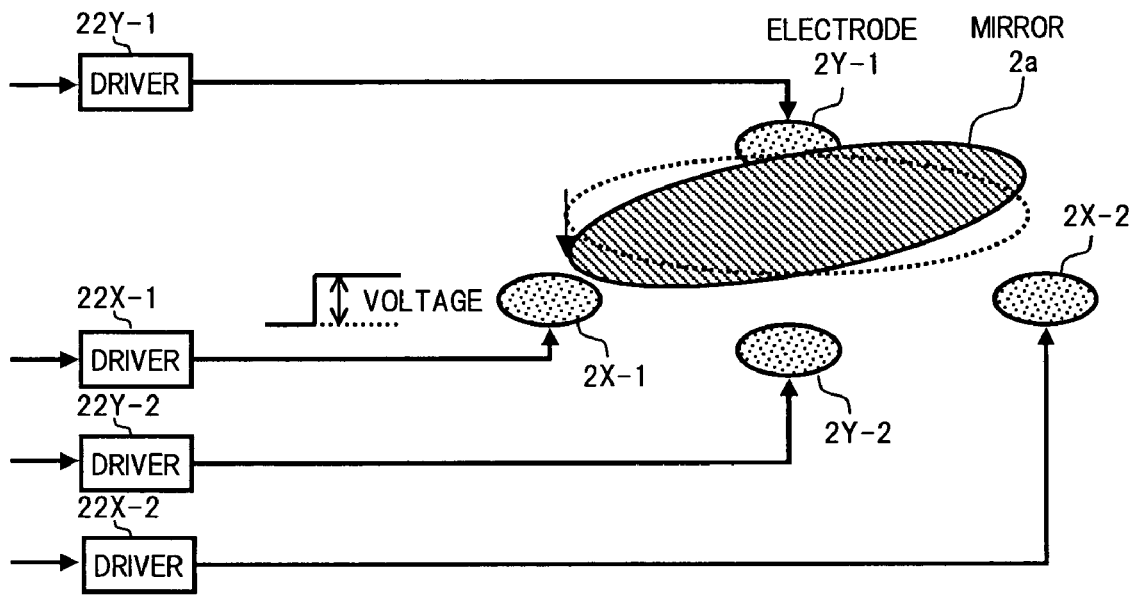
FIG. 26 is a diagram schematically showing the driving state of a typical MEMS mirror.
Figure 27:
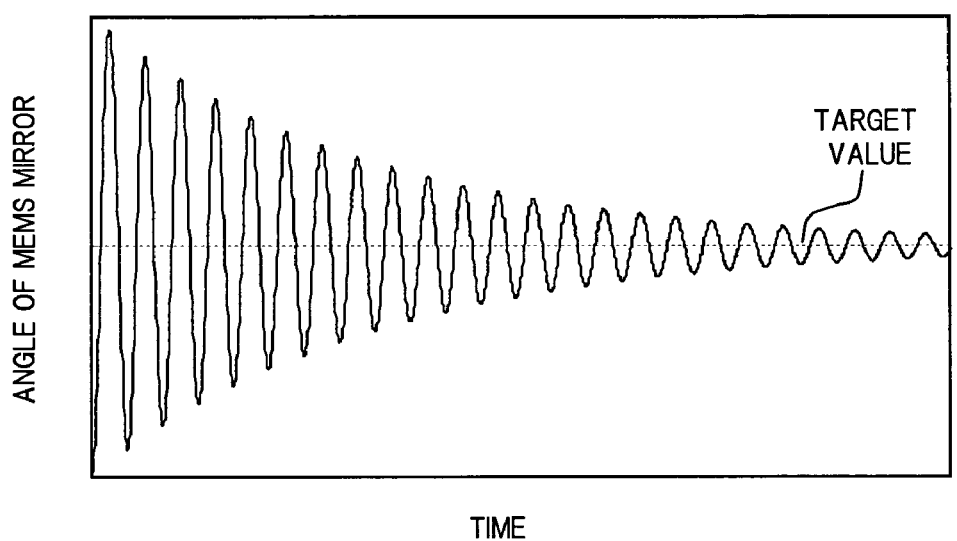
FIG. 27 is a diagram for explaining a resonance action of the typical MEMS mirror.

The MEMS mirror array 2A is arranged to tilt so that the normal direction of a plane on which mirror surfaces of the respective MEMS mirrors are arranged is not parallel to a propagation direction (optical axis direction) of an optical signal sent from the collimator array 1A. Further, the MEMS mirror array 2B is arranged at a required position at which light reflected by the respective MEMS mirrors of the MEMS mirror array 2A is reflected again by the corresponding MEMS mirrors, to be guided to the collimator array 1B. Each of the MEMS mirror arranged in the MEMS mirror arrays 2A and 2B is a known micro tilt mirror made up using micromachining (MEMS) technology. More specifically, for example a movable plate with the X axis direction (first axial direction) and the Y axis direction (second axial direction) supported by torsion bars and formed with a mirror on an upper surface thereof, is disposed on a silicon substrate integrally, and an oscillation angle of the mirror is variably controlled by rotating the movable plate about the torsion bars with a magnetic force generated by applying a required voltage to four electrodes respectively arranged in the vicinity of opposite ends in the respective axial directions of the movable plate (refer to FIG. 26).

In the optical coupler array 11, a plurality of optical couplers are arranged corresponding to the respective output optical fibers of the output optical fiber array 10B, and a part of the optical signal propagated through each output optical fiber is branched by each optical coupler to be sent to the optical power detection section 12.

The optical power detection section 12, for example as shown on an upper left part of FIG. 1, includes a photodetector 12A that receives monitor light branched by each optical coupler of the optical coupler array 11 to generate a current signal corresponding to optical power of the monitor light, and an I/V converter 12B that converts the current signal output from the photodetector 12A into a voltage signal. In FIG. 1, only one set of the photodetector 12A and the I/V converter 12B is shown. However, it is assumed that actually, the optical power detection section 12 is provided with the photodetectors 12A and the I/V converters 12B respectively corresponding to the respective optical couplers of the optical coupler array 11, that is, corresponding to the number of output channels of the optical signal exchanger.

The comparison control section 13, for example as shown a center left part of FIG. 1, includes an A/D converter 13A, an operational circuit 13B and a selector 13C. The A/D converter 13A is a typical voltage circuit that converts an analog voltage signal output from the optical power detection section 12 into a digital signal. The converted digital voltage signal is sent to the operational circuit 13B. In the operational circuit 13B, while omitted from the figure, that is supplied with a signal indicating a previously set target value, a difference between an output signal from the A/D converter 13A and the target value is calculated, and a digital control signal for correcting a drive condition of the MEMS mirror to be controlled so that a value of the difference becomes minimum is sent to the selector 13C. The MEMS mirror to be controlled is specified by supplying information related to an input channel corresponding to an output channel detected by the optical power detection section 12. The selector 13C is a circuit that selectively switches and outputs a control signal from the operational circuit 13B, corresponding to the MEMS mirror drive sections 14A and 14B.

Here, an example is shown where the target value is previously set, and a control signal is generated corresponding to the difference to the target value. However, the present invention is not limited to this, and for example, instead of setting such a target value, a control signal may be generated to optimize the angle of the reflecting surface of the MEMS mirror to be controlled, so that the optical power detected by the optical power detection section 12 is approximately maximized (becomes close to a maximum). As described later, the functional effect according to the present invention can be similarly obtained irrespective of the method of the feedback control of the MEMS mirror.

The MEMS mirror drive section 14A is for drive controlling the MEMS mirror array 2A on an input side of the optical signal exchanger. Furthermore, the MEMS mirror drive section 14B is for drive controlling the MEMS mirror array 2B on an output side of the optical signal converter. More specifically, the respective MEMS mirror drive sections 14A and 14B include, corresponding to the plurality of MEMS mirrors of the MEMS mirror arrays 2A and 2B, for example as shown on the right side of FIG. 1, a pair of D/A converters 21X-1, 21X-2 and drivers 22X-1, 22X-2 corresponding to the X-axis direction, and a pair of D/A converters 21Y-1, 21Y-2 and drivers 22Y-1, 22Y-2 corresponding to the Y-axis direction.

The D/A converters 21X-1, 21X-2, 21Y-1, and 21Y-2 (hereunder also generically referred to as D/A converters 21) provided in the respective MEMS mirror drive sections 14A and 14B convert digital control signals transmitted from the comparison control section 13 via the respective resonance component removing sections 15A and 15B into analog values, to output to the respective drivers 22X-1, 22X-2, 22Y-1, and 22Y-2 (hereunder generically referred to as drivers 22). Each driver 22 applies a voltage in accordance with the analog value from the D/A converter 21, to an electrode of the corresponding MEMS mirror, to thereby drive the electrode, and adjusts the angle of the reflecting surface of the MEMS mirror.

Each of the resonance component removing sections 15A and 15B has a function of removing a resonance frequency of each MEMS mirror arranged in the respective MEMS mirror arrays 2A and 2B, that is, the frequency component corresponding to $\omega_{MEMS}$ in the equation (1), from the control signal output from the comparison control section 13. Specifically, in this embodiment, for example as shown in FIG. 1, the resonance component removing section 15A corresponding to the MEMS mirror drive section 14A comprises a plurality of digital filters 31X and a plurality of selectors 32X corresponding to driving of the plurality of MEMS mirrors on the MEMS mirror array 2A in the X axis direction, and a plurality of digital filters 31Y and a plurality of selectors 32Y corresponding to driving of the plurality of MEMS mirrors on the MEMS mirror array 2A in the Y axis direction. Further, the resonance component removing section 15B corresponding to the MEMS mirror drive section 14B comprises a plurality of digital filters 31X and a plurality of selectors 32X corresponding to driving of the plurality of MEMS mirrors on the MEMS mirror array 2B in the X axis direction, and a plurality of digital filters 31Y and a plurality of selectors 32Y corresponding to driving of the plurality of MEMS mirrors on the MEMS mirror array 2B in the Y axis direction.

The respective configurations of the resonance component removing sections 15A and 15B are, in other words, such that a resonance component in each control signal sent to the D/A converters 21X-1 and 21X-2 corresponding to the two electrodes in the X axis direction is removed by using one shared digital filter 31X, and the resonance component in each control signal sent to the D/A converters 21Y-1 and 21Y-2 corresponding to the two electrodes in the Y axis direction is removed by using one shared digital filter 31Y, for the individual MEMS mirrors on the MEMS mirror array. The reason why sharing of the digital filter corresponding to each axial direction becomes possible is that the reflecting surface of the mirror is tilted by applying a voltage to only one of the two electrodes existing in the coaxial direction, in driving the MEMS mirror.

The digital filters 31X and 31Y in the respective resonance component removing sections 15A and 15B can be realized by using, for example, a band-elimination filter of Butterworth type, generally referred to as a notch filter, following a transfer function $G_n(S)$ shown in the following equation (2):

$$G_n(s) = \frac{s^2 + \omega_n^2}{s^2 + (1/Q) \cdot \omega_n \cdot s + \omega_n^2} \quad (2)$$

where $\omega_n$ is a central frequency in an elimination band, Q is an index expressing the elimination bandwidth, and s is a Laplacian operator. The resonance frequency component of the MEMS mirror included in the control signal can be removed, by using a notch filter in which the value of $\omega_n$ in the transfer function $G_n(S)$ is substantially made to be coincident with $\omega_{MEMS}$ in the aforementioned equation (1), as the digital filters 31X and 31Y. As a specific configuration of each of the digital filters 31X and 31Y, it is possible to apply, for example, an IIR-type digital filter circuit. However, the digital filters 31X and 31Y are not limited to the circuit configuration of the IIR type, and it is possible to apply a known digital filter circuit following the transfer function in equation (2). The filter used for removing the resonance component in the present invention is not limited only to the band-elimination filter of Butterworth type, and it is also possible to apply, for example, a Chebyshev type filter and an elliptic function type filter, and an application of a low-pass filter having a cutoff frequency corresponding to the resonance frequency is also possible.

In the control apparatus having such a constitution, the optical signal input to the optical signal exchanger via the input optical fiber array 10A passes through a corresponding collimator in the collimator array 1A on the input side, to become parallel light, which is sent towards the MEMS mirror array 2A. The optical signal having reached the MEMS mirror array 2A is reflected by the corresponding MEMS mirror so that the propagation direction thereof is changed, and is then sent towards the MEMS mirror array 2B, where it is further reflected by a required MEMS mirror so that the propagation direction thereof is changed.

The optical signal sequentially reflected by the respective MEMS mirror arrays 2A and 2B passes through the collimator array 1B on the output side and is output to a specific optical fiber in the output optical fiber array 10B, and a part of the optical signal is branched by a corresponding optical coupler in the optical coupler array 11 to be sent to the optical power detection section 12. In the optical power detection section 12, the optical signal from the optical coupler array 11 is received by the photodetector 12A to generate a current signal corresponding to the optical power. The current signal is converted to a voltage signal by the I/V converter 12B, to be output to the comparison control section 13 together with information of the corresponding output channel. At this time, when the MEMS mirror located on the propagation path in the output channel where the power has been detected is resonating, the power of the output light is varied according to the resonance frequency. Hence, the voltage signal output from the optical power detection section 12 to the comparison control section 13 includes a frequency component corresponding to the resonance frequency of the MEMS mirror.

In the comparison control section 13, the analog voltage signal output from the optical power detection section 12 is converted to a digital value by the A/D converter 13A, to be sent to the operational circuit 13B. The operational circuit 13B determines a difference between the digital value from the A/D converter 13A and a previously set target value, generates a digital control signal for correcting the angle of the reflecting surface on one or both of the MEMS mirrors located in the propagation path in the channel so that the difference approaches zero, and outputs the digital control signal to the selector 13C. The selector 13C selectively outputs the control signal from the operational circuit 13B to the respective digital filters 31X and 31Y in the resonance component removing sections 15A and 15B, corresponding to the MEMS mirror to be controlled.

Figure 3:
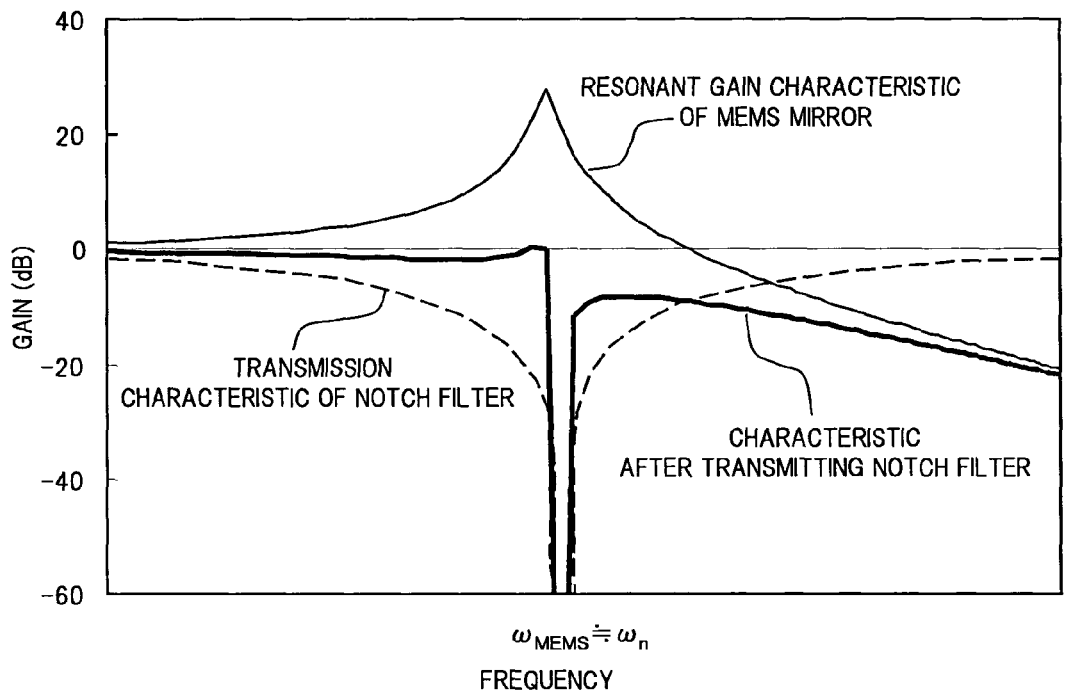
FIG. 3 is a diagram for explaining an operation of a resonance component removing section in the first embodiment.

Each of the digital filters 31X and 31Y removes the frequency component corresponding to the resonance action of the MEMS mirror, from the digital control signal sent from the comparison control section 13, to output the digital control signal to each of the corresponding selectors 32X and 32Y. Specifically, for example as shown in FIG. 3, the control signal corresponding to a resonant gain characteristic of the MEMS mirror shown by a thin line passes through the notch filter having a transmission characteristic shown by a broken line. As a result, a control signal in which the resonance frequency component is removed as shown by a bold line is generated. The respective selectors 32X and 32Y selectively output the control signals which have passed through the digital filters 31X and 31Y to the D/A converters 21X-1 and 21Y-1 or to the D/A converters 21X-2 and 21Y-2 in the MEMS mirror drive sections 14A and 14B, corresponding to whichever voltage applied to the two electrodes in the coaxial direction of the MEMS mirror is to be controlled.

In each of the MEMS mirror drive sections 14A and 14B, the digital control signal from each of the resonance component removing sections 15A and 15B is converted into an analog value by the D/A converter 21, to be sent to the corresponding driver 22. In each driver 22, the drive voltage to be applied to the electrode of the corresponding MEMS mirror is adjusted, in accordance with the control signal converted to the analog value, so that the angle of the MEMS mirror is feedback controlled.

According to the control apparatus of the first embodiment, the digital filter for removing the resonance component in the control signal is shared with respect to the coaxial direction of the individual MEMS mirrors on the respective MEMS mirror arrays 2A and 2B, taking into consideration that the reflecting surface is tilted by supplying a drive voltage to only one of the two electrodes existing in the coaxial direction of the MEMS mirror. As a result, an influence on the feedback control by the resonance action of the MEMS mirror can be reduced, while suppressing an increase of the circuit size. Therefore, it becomes possible to stably control the power of the optical signal in each channel output from the optical signal exchanger, and switching of the input and output channels in the optical signal exchanger can be reliably carried out.

Next is a description of a control apparatus of an optical signal exchanger according to a second embodiment of the present invention.

Figure 4:
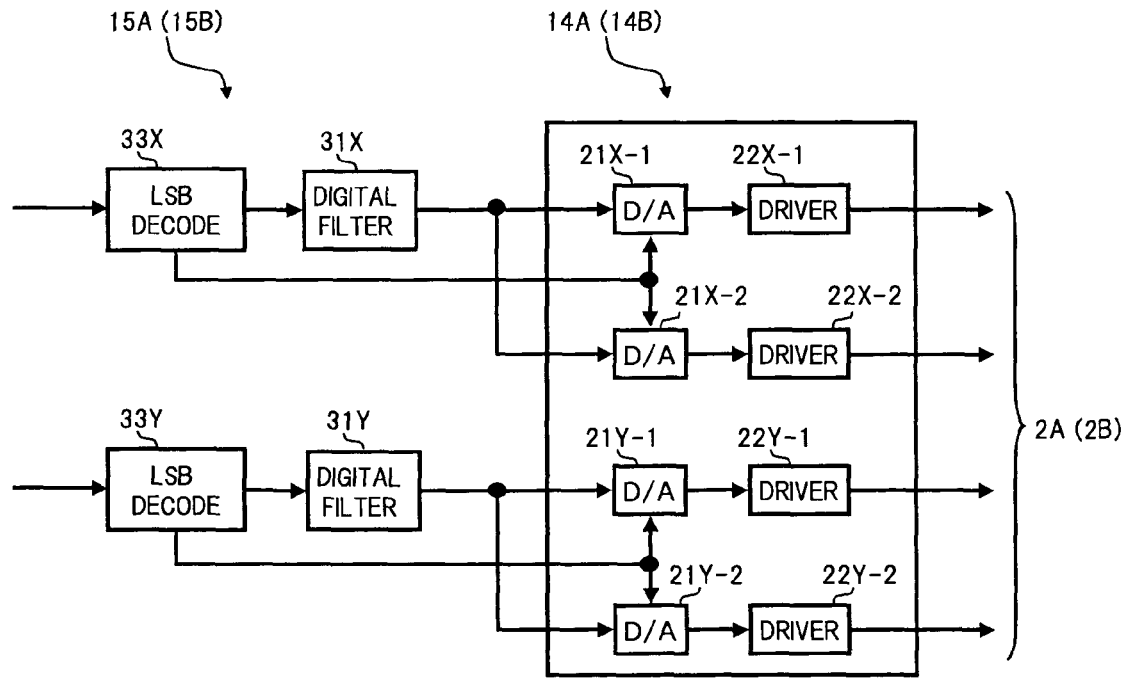
FIG. 4 is a block diagram showing the main configuration of a resonance component removing section and an MEMS mirror drive section in a control apparatus according to a second embodiment of the present invention.

FIG. 4 is a block diagram showing the main configuration of a resonance component removing section and an MEMS mirror drive section in the control apparatus according to the second embodiment.

In FIG. 4, the configuration of the control apparatus in this embodiment is different from that of the first embodiment in that the respective resonance component removing sections 15A and 15B include, respectively, LSB decode circuits 33X and 33Y, instead of the selectors 32X and 32Y, and on/off of the D/A converter 21 in the MEMS mirror drive section is switched, according to the least significant bit detected by each of the LSB decode circuits 33X and 33Y.

In FIG. 4, only the configuration corresponding to one of the plurality of MEMS mirrors on the MEMS mirror array 2A (2B) is shown. However, the same configuration is correspondingly provided in each of the plurality of MEMS mirrors, to thereby constitute the resonance component removing section 15A (15B) and the MEMS mirror drive section 14A (14B) in this embodiment. The configuration of other parts of the control apparatus other than the configuration shown in FIG. 4, and the configuration of the overall optical signal exchanger are the same as in the first embodiment shown in FIG. 1 and FIG. 2, and hence the description thereof is omitted here.

The LSB decode circuit 33X is provided, for example, before the digital filter 31X, for detecting the least significant bit in the control signal sent from the comparison control section 13 to the digital filter 31X, and outputting a switching signal to turn on one of the D/A converters 21X-1 and 21X-2 and to turn off the other, according to the detection result. The LSB decode circuit 33Y is also provided, for example, before the digital filter 31Y, as with the LSB decode circuits 33X, for detecting the least significant bit in the control signal sent from the comparison control section 13 to the digital filter 31Y, and outputting a switching signal to turn on one of the D/A converters 21Y-1 and 21Y-2 and to turn off the other, according to the detection result.

In the second embodiment having such a constitution, the digital value of the control signal sent to the D/A converter is used to switch on and off each D/A converter, in the drive control of the MEMS mirror, taking into consideration that the two D/A converters corresponding to the coaxial direction of one MEMS mirror are not operated at the same time, but operated alternatively. Specifically, for example, an odd digital code is allotted as a control signal to the D/A converter 21X-1 (21Y-1), and an even digital code is allotted as a control signal to the D/A converter 21X-2 (21Y-2). As a result, the least significant bit in the digital value of the control signal directly serves as an identifier, and when the least significant bit is "1", the D/A converter 21X-1 (21Y-1) is switched on, and the D/A converter 21X-2 (21Y-2) is switched off. When the least significant bit is "0", the D/A converter 21X-1 (21Y-1) is switched off, and the D/A converter 21X-2 (21Y-2) is switched on. Hence, the function corresponding to the selector can be realized. In this case, in the actual drive control of the MEMS mirror, since the drive voltage applied to each electrode depends on the digital code, the information added to the least significant bit as the identifier may affect the control. However, when high-bit D/A conversion is carried out, an error in the drive voltage due to the least significant bit becomes allowable. Hence, it is possible to reliably perform the drive control of the MEMS mirror by the switching method as described above.

Next is a description of a control apparatus of an optical signal exchanger according to a third embodiment of the present invention.

In the second embodiment, switching of operation of the D/A converter corresponding to the coaxial direction of one MEMS mirror is carried out according to whether the digital value of the control signal is an odd number or even number. However, it is also possible to switch the operation of the D/A converter according to whether the digital value of the control signal is a certain value or higher. In the third embodiment, a control apparatus using such a switching system will be described.

Figure 5:
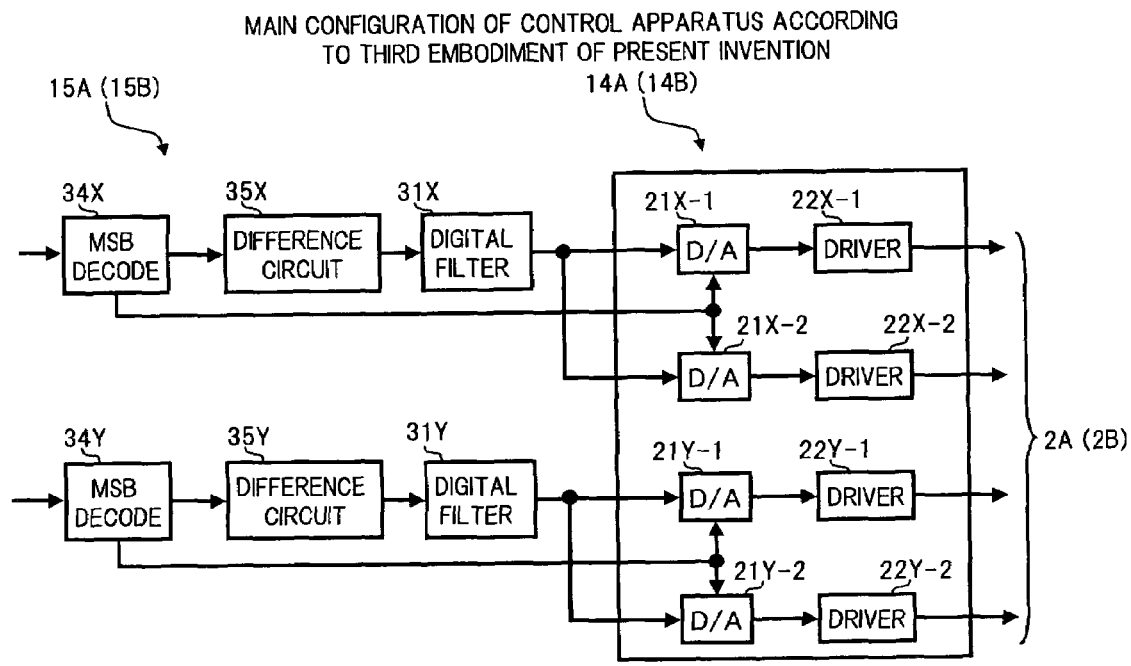
FIG. 5 is a block diagram showing the main configuration of a resonance component removing section and an MEMS mirror drive section in a control apparatus according to a third embodiment of the present invention.

FIG. 5 is a block diagram showing the main configuration of a resonance component removing section and an MEMS mirror drive section in the control apparatus according to the third embodiment.

In FIG. 5, the configuration of the control apparatus in this embodiment is different from that of the second embodiment shown in FIG. 4 in that the respective resonance component removing sections 15A and 15B include MSB decode circuits 34X and 34Y and difference circuits 35X and 35Y, respectively, instead of the LSB decode circuits 33X and 33Y, and on and off of the D/A converter 21 is switched, according to the most significant bit detected by each of the MSB decode circuits 34X and 34Y.

Also in FIG. 5, only the configuration corresponding to one of the plurality of MEMS mirrors on the MEMS mirror array 2A (2B) is shown. However, the same configuration is correspondingly provided in each of the plurality of MEMS mirrors, to thereby constitute the resonance component removing section 15A (15B) and the MEMS mirror drive section 14A (14B) in this embodiment. The configuration of the other parts of the control apparatus other than the configuration shown in FIG. 5, and the configuration of the overall optical signal exchanger are the same as in the first embodiment shown in FIG. 1 and FIG. 2, and hence the description thereof is omitted here.

The MSB decode circuit 34X is provided, for example, before the digital filter 31X, for detecting the most significant bit in the control signal sent from the comparison control section 13 to the digital filter 31X via the difference circuit 35X, and outputting a switching signal to turn on one of the D/A converters 21X-1 and 21X-2 and to turn off the other, according to the detection result. The MSB decode circuit 34Y is also provided, for example, before the digital filter 31Y, as with the MSB decode circuits 34X, for detecting the most significant bit in the control signal sent from the comparison control section 13 to the digital filter 31Y via the difference circuit 35Y, and outputting a switching signal to turn on one of the D/A converters 21Y-1 and 21Y-2 and to turn off the other, according to the detection result.

Each of the difference circuits 35X and 35Y determines a difference between the digital value of the control signal which has passed through each of the MSB decode circuits 34X and 34Y and a central value described later, and outputs a digital signal indicating a value of the difference to each of the digital filters 31X and 31Y.

Figure 6:
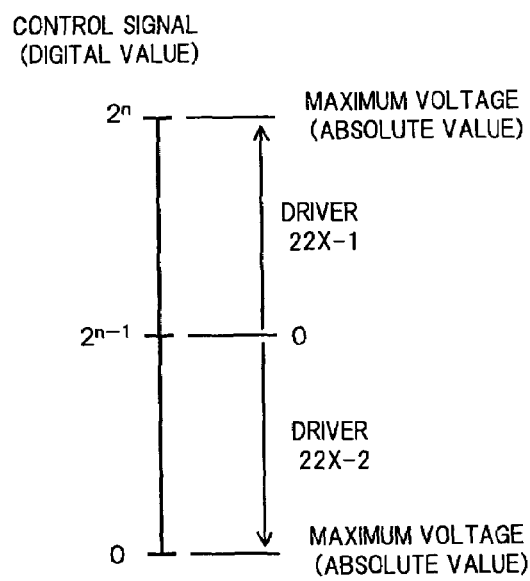
FIG. 6 is a diagram for explaining allotment of digital codes in the third embodiment.

In the third embodiment having such a constitution, for example, when n-bit D/A conversion is performed by the respective D/A converters 21 in the respective MEMS mirror drive sections 14A and 14B, as shown in FIG. 6, a value corresponding to $2^{n-1}$ in a digital value is previously set as the above described central value, and $2^{n-1}$ to $2^n$ are allotted to the driver 22X-1 (22Y-1), and 0 to $2^{n-1}$ are allotted to the driver 22X-2 (22Y-2). As a result, it becomes possible to perform switching of operation of the D/A converter, depending on a small and large relation of the digital value of the control signal with respect to the central value $2^{n-1}$, and the most significant bit in the digital value serves as an identifier. Specifically, when the most significant bit is "1", the D/A converter 21X-1 (21Y-1) is switched on, and the D/A converter 21X-2 (21Y-2) is switched off. When the most significant bit is "0", the D/A converter 21X-1 (21Y-1) is switched off, and the D/A converter 21X-2 (21Y-2) is switched on. Hence, the function corresponding to the selector can be realized. At this time, the difference value determined by each of the difference circuits 35X and 35Y, that is, the difference value of the digital value of the control signal with respect to the central value $2^{n-1}$ is used as the control value of the drive voltage, and this difference value is sent to each of the digital filters 31X and 31Y. The difference value determined by each of the difference circuits 35X and 35Y may be a simple difference or an absolute value. When a simple difference value is used, the drive voltage by the driver 22X-2 (22Y-2) to which 0 to $2^{n-1}$ are allotted becomes a negative value. However, the mirror angle is determined by the absolute value of the drive voltage at the time of driving the MEMS mirror, and hence there is no problem in control.

According to the third embodiment, the digital value of the control signal is allotted to each driver, based on a required central value, and switching of on and off of the respective D/A converters is carried out, using the most significant bit in the digital value as the identifier. As a result, it is possible to reliably carry out the drive control of the MEMS mirror, in the same manner as in the second embodiment.

Next is a description of a control apparatus of an optical signal exchanger according to a fourth embodiment of the present invention. In the fourth embodiment, an application example associated with the control apparatus in the third embodiment will be considered.

Figure 7:
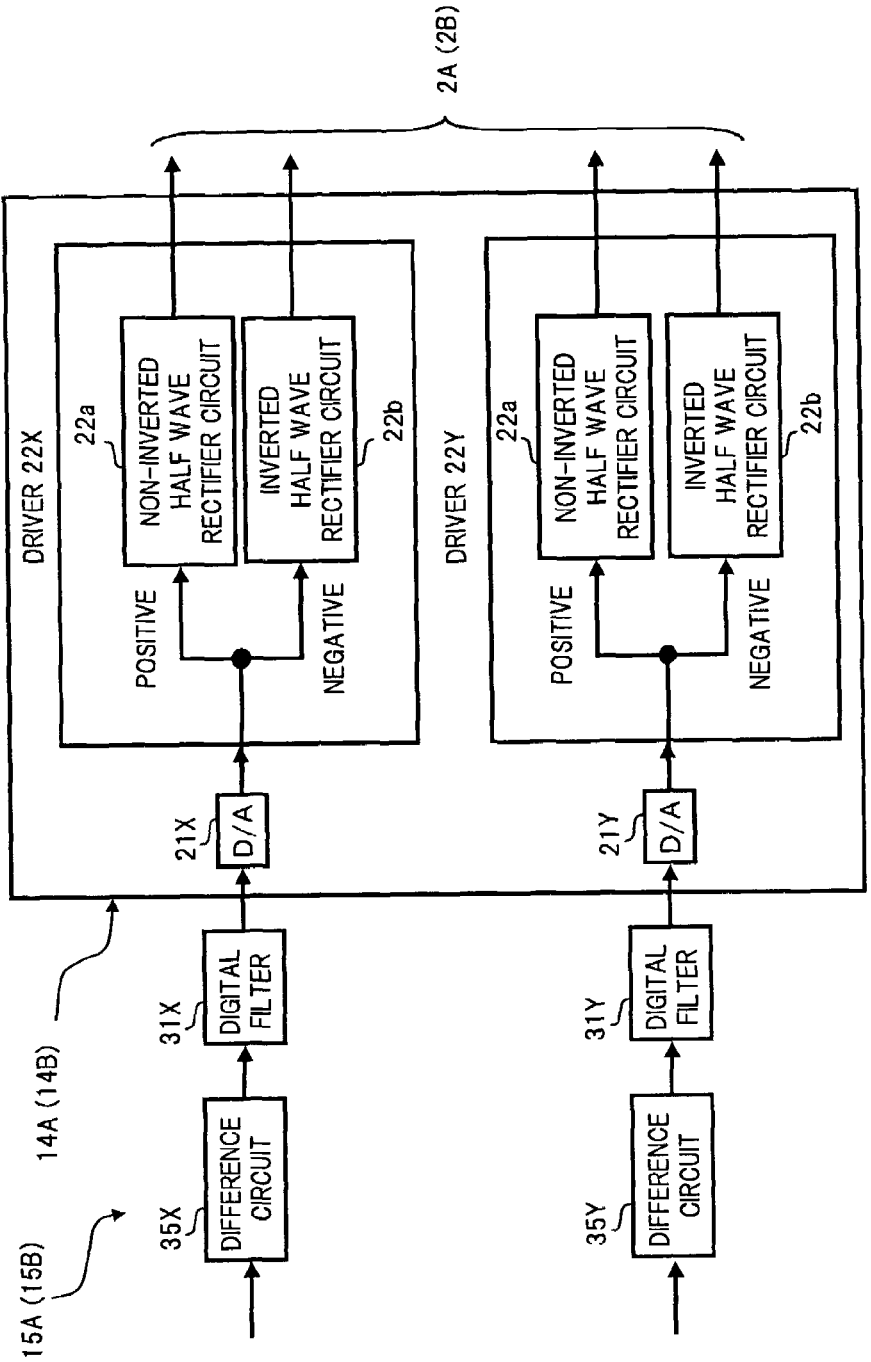
FIG. 7 is a block diagram showing the main configuration of a resonance component removing section and an MEMS mirror drive section in a control apparatus according to a fourth embodiment of the present invention.

FIG. 7 is a block diagram showing the main configuration of a resonance component removing section and an MEMS mirror drive section in the control apparatus according to the fourth embodiment.

The main configuration of the control apparatus shown in FIG. 7 is different from that of the third embodiment shown in FIG. 5 in that, in the respective MEMS mirror drive sections 14A and 14B, one driver 22X using a half wave rectifier circuit is used instead of the two drivers 22X-1 and 22X-2 in the X axis direction, and one driver 22Y using a half wave rectifier circuit is used instead of the two drivers 22Y-1 and 22Y-2 in the Y axis direction, and the D/A converter that has been provided two in number for each axial direction is shared, as D/A converters 21X and 21Y. By such modification in the respective MEMS mirror drive sections 14A and 14B, the MSB decode circuits 34X and 34Y can be omitted in the respective resonance component removing sections 15A and 15B.

Also in FIG. 7, only the configuration corresponding to one of the plurality of MEMS mirrors on the MEMS mirror array 2A (2B) is shown. However, the same configuration is correspondingly provided in each of the plurality of MEMS mirrors, to thereby constitute the resonance component removing section 15A (15B) and the MEMS mirror drive section 14A (14B) in this embodiment. The configuration of the other parts of the control apparatus other than the configuration shown in FIG. 7, and the configuration of the overall optical signal exchanger are the same as in the first embodiment shown in FIG. 1 and FIG. 2, and hence the description thereof is omitted here.

Specifically, each of the drivers 22X and 22Y is constituted of a combination of a non-inverted half wave rectifier circuit 22a and an inverted half wave rectifier circuit 22b. A positive voltage value output from the D/A converter 21X is supplied to the non-inverted half wave rectifier circuit 22a, and a negative voltage value output from the D/A converter 21X is supplied to the inverted half wave rectifier circuit 22b.

According to such a configuration, the D/A converter and the driver can be shared for each of X axis direction and Y axis direction of one MEMS mirror, and it is not necessary to provide the MSB decode circuits 34X and 34Y in the respective resonance component removing sections 15A and 15B. As a result, the influence on the feedback control by the resonance action of the MEMS mirrors can be reduced, while effectively suppressing the increase of the circuit size.

Figure 8:
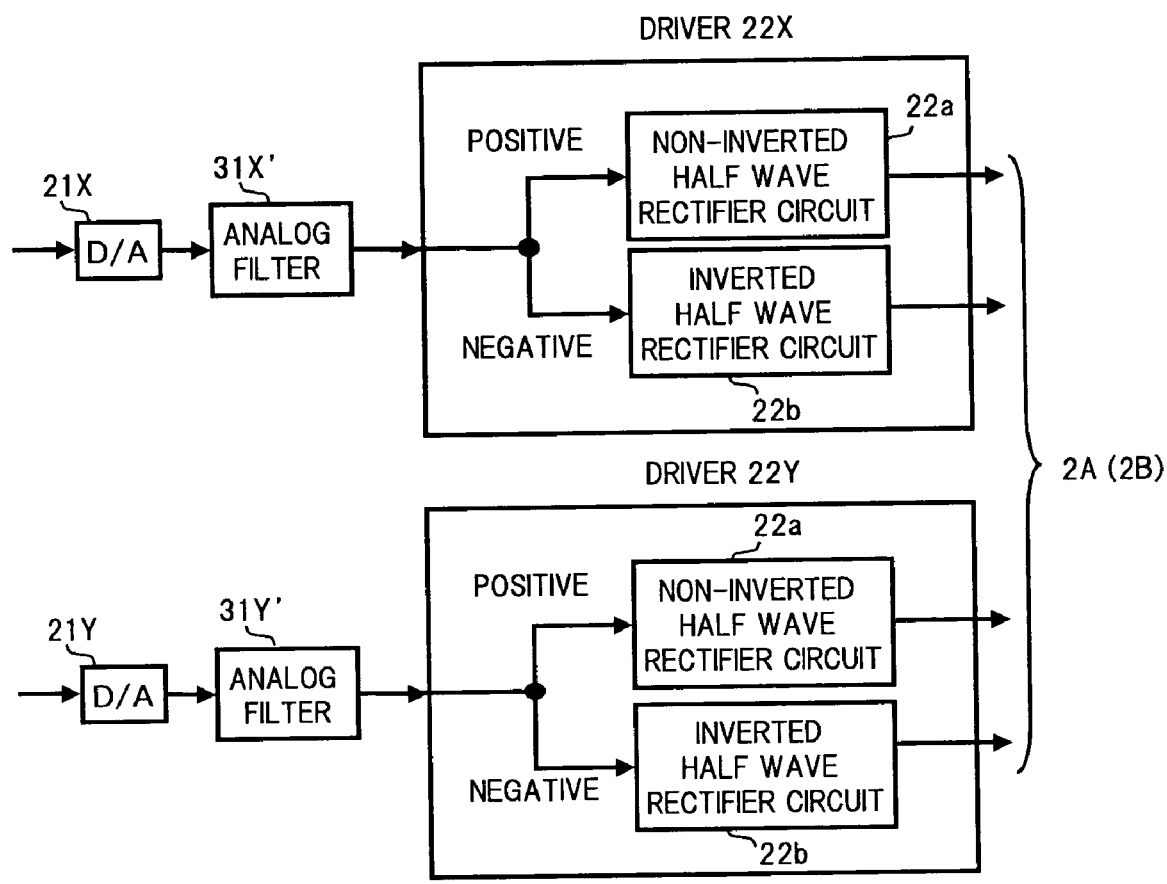
FIG. 8 is a diagram showing a configuration of an application example related to the fourth embodiment.

In the fourth embodiment, for example, as shown in FIG. 8, it is possible to provide analog filters 31X' and 31Y' between the D/A converters 21X and 21Y, and the drivers 22X and 22Y, respectively, instead of the digital filters 31X and 31Y. The analog filters 31X' and 31Y' are analog notch filters or the like following the transfer function in equation (2).

Next is a description of a control apparatus of an optical signal exchanger according to a fifth embodiment of the present invention.

Figure 9:
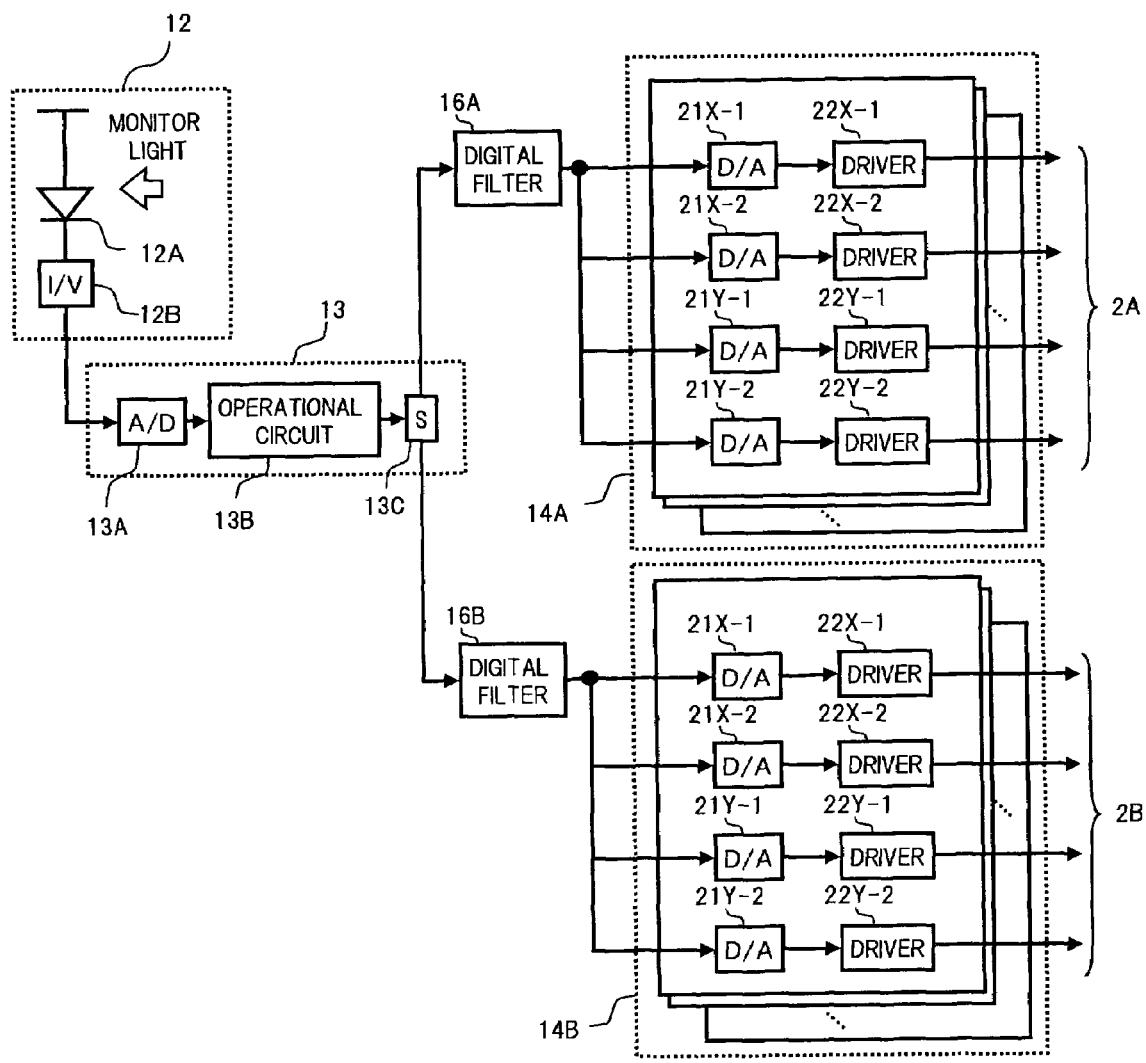
FIG. 9 is a block diagram showing a configuration of a control apparatus according to a fifth embodiment of the present invention.

FIG. 9 is a block diagram showing a configuration of a control apparatus according to the fifth embodiment.

As shown in FIG. 9, the control apparatus in this embodiment is characterized in that one digital filter 16A is provided corresponding to all MEMS mirrors on the MEMS mirror array 2A, and one digital filter 16B is provided corresponding to all MEMS mirrors on the MEMS mirror array 2B. The configuration of the control apparatus other than the part where the digital filters 16A and 16B shared by each MEMS mirror array are provided, and the configuration of the overall optical signal exchanger are the same as in the first embodiment shown in FIG. 1 and FIG. 2, and hence the description thereof is omitted here.

In the first embodiment described above, the digital filter removing the resonance component in the control signal is shared with respect to the coaxial direction of the individual MEMS mirrors on the respective MEMS mirror arrays 2A and 2B, taking into consideration that the reflecting surface is tilted by supplying a drive voltage to only one of the two electrodes existing in the coaxial direction of the MEMS mirror. Further, in this embodiment, taking into consideration that since the respective MEMS mirror arrays 2A and 2B are formed respectively in the same process, there is a high possibility that the plurality of MEMS mirrors on the respective arrays have substantially the same resonance frequency, the digital filter for removing the resonance component is shared by all MEMS mirrors corresponding to the respective MEMS mirror arrays 2A and 2B.

Figure 10:
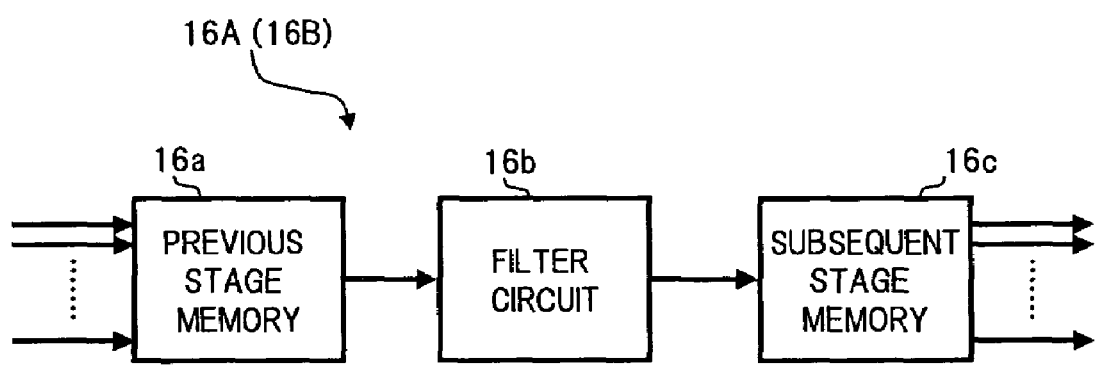
FIG. 10 is a block diagram showing a specific configuration of a digital filter in the fifth embodiment.

Specifically, for example, as shown in FIG. 10, each of the digital filters 16A and 16B shared by the respective MEMS mirror arrays 2A and 2B includes a previous stage memory 16a, a filter circuit 16 and a subsequent stage memory 16c. The previous stage memory 16a is a known memory such as a DPRAM, that can store collectively digital control signals output from the comparison control section 13, respectively corresponding to the plurality of (for example, n) MEMS mirrors on the MEMS mirror array. Digital values stored in this previous stage memory 16a are sequentially read by the filter circuit 16b, as described below. The filter circuit 16b is a known digital filter circuit following the transfer function in equation (2). The subsequent stage memory 16c, is a known memory such as a DPRAM, that can temporarily store the control signals that have passed through the filter circuit 16b, and output the stored control signals to the D/A converter 21 at required timing respectively corresponding to the n MEMS mirrors.

Figure 11:
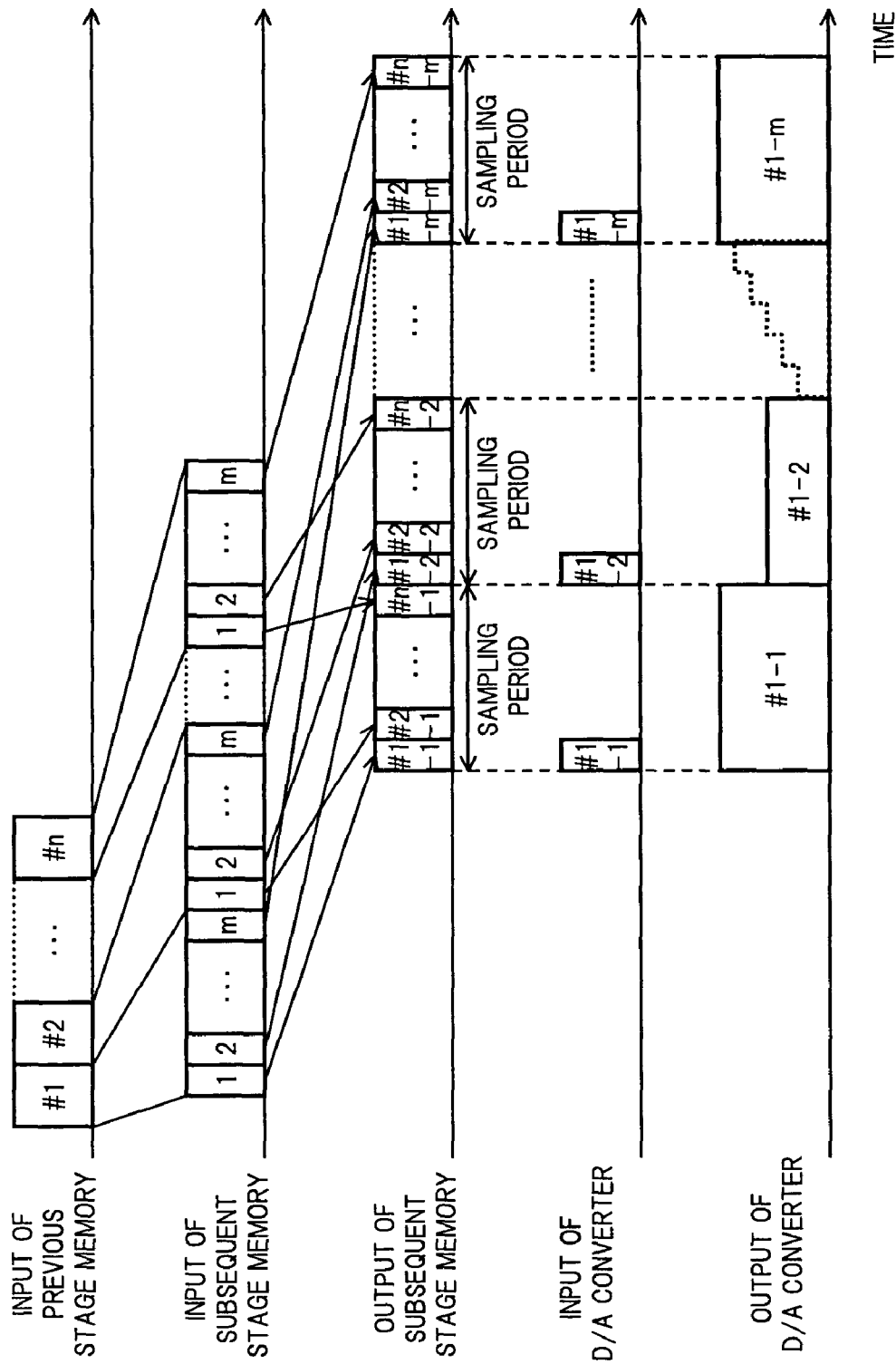
FIG. 11 is a time chart for explaining an operation of the digital filter in the fifth embodiment.

FIG. 11 is a time chart for specifically describing the operations of the digital filters 16A and 16B. In each of the digital filters 16A and 16B, as shown in the first stage in FIG. 11, control signals output from the comparison control section 13 respectively corresponding to the MEMS mirrors of from #1 to #n are input to the previous stage memory 16a to be stored. Then, the control signals that have been read from the previous stage memory 16a and have passed through the filter circuit 16b become, as shown in the second stage in FIG. 11, m digital codes #1-1 to #1-m for the #1 MEMS mirror, and m digital codes #2-1 to #2-m for the #2 MEMS mirror, and in the same way, m digital codes #n-1 to #n-m for the #n MEMS mirror, and are then input to the subsequent stage memory 16c, to be stored. In the subsequent stage memory 16c, as shown in the third stage in FIG. 11, the first digital codes #1-1 to #n-1 with respect to the MEMS mirrors of from #1 to #n are arranged in a first sampling period, the second digital codes #1-2 to #n-2 are arranged in a next sampling period, and in the same way, rearrangement of the stored digital codes are performed up to the m-th digital codes #1-m to #n-m. Then, the rearranged digital codes are sequentially output to the corresponding D/A converter 21. In the fourth stage in FIG. 11, for example, the digital codes input to the D/A converter 21 corresponding to the #1 MEMS mirror are shown. As shown in the fifth stage in FIG. 11, the D/A converter 21 converts the digital codes from the subsequent stage memory 16c, into analog values that are held over one sampling period, and then output them to the corresponding driver 22. As a result, a control value in which the resonance component is removed by the digital filter is transmitted to the driver 22 corresponding to each MEMS mirror.

According to the control apparatus in the fifth embodiment, the digital filter for removing the resonance component is shared by all MEMS mirrors corresponding to the respective MEMS mirror arrays 2A and 2B, taking into consideration that since the respective MEMS mirror arrays 2A and 2B are formed in the same process, there is a high possibility that the plurality of MEMS mirrors on the respective arrays have substantially the same resonance frequency. As a result, the influence on the feedback control by the resonance action of the MEMS mirrors can be reduced, while suppressing the increase of the circuit size.

In the fifth embodiment, the filter for removing the resonance component is shared in each MEMS mirror array. However, for example, an application is also possible in which the filter for removing the resonance component is shared in each of axial directions of the X axis and Y axis, with respect to all MEMS mirrors on the two MEMS mirror arrays 2A and 2B.

In the fifth embodiment, the filter is shared, taking into consideration that there is a high possibility that the plurality of MEMS mirrors on the MEMS mirror arrays have substantially the same resonance frequency. However, there is a possibility that a significant difference still exists in the resonance frequency of the individual MEMS mirror, and for a certain MEMS mirror on the MEMS mirror array, a difference is caused between the resonance frequency thereof and a cutoff frequency of the filter so that the resonance component cannot be suppressed sufficiently. In such a case, for example, the filter shared for each MEMS mirror array is placed in multi-stages. In other words, by connecting in series a plurality of filters having the same characteristic, the elimination bandwidth is enlarged. As a result, the resonance component, including a variation in the resonance frequency of the individual MEMS mirror, can be suppressed. Moreover, the same effect as that of placing the filters in multi-stages can be obtained, for example, by using a filter having a small Q value in equation (2), instead of placing the filters in multi-stages.

Next is a description of a control apparatus of an optical signal exchanger according to a sixth embodiment of the present invention.

Figure 12:
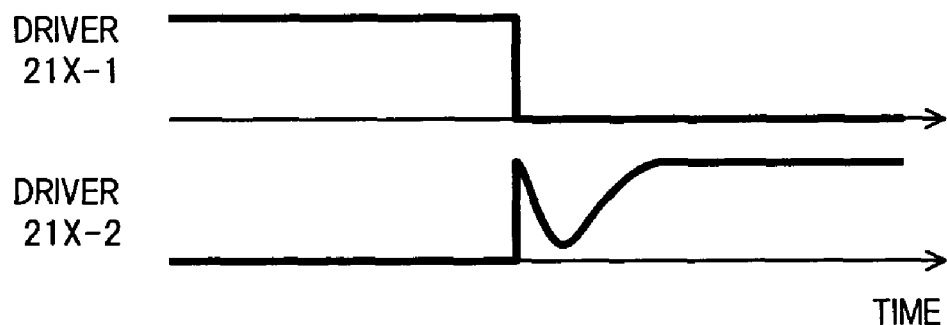
FIG. 12 is a diagram showing one example of a driving waveform at the time of switching a driver in the first to fifth embodiments of the present invention.

In the first to fifth embodiments, when the driver 22 to be driven is switched by switching the input and output channels or the like, that is, when the electrode to which the drive voltage is applied, is switched to the electrode on the coaxially opposite side, the applied voltage to the electrode that has been driven before switching is required to be dropped to 0V, and the control signal to be supplied to the D/A converter 21 corresponding to that electrode is reset to an initial value. In such a constitution, for example as shown in FIG. 12, a control signal having a driving waveform capable of suppressing the resonance action of the MEMS mirror is supplied to the side to be driven after switching (driver 22X-2a side). However, since a control signal having a driving waveform momentarily changing to a value corresponding to 0V is supplied to the side having been driven before switching (driver 22X-1 a side), there is a possibility that the resonance phenomenon of the MEMS mirror may occur due to the driving operation by this control signal. Hence, in the sixth embodiment, a control method for suppressing the resonance action at the time of switching the driver will be described.

Figure 13:
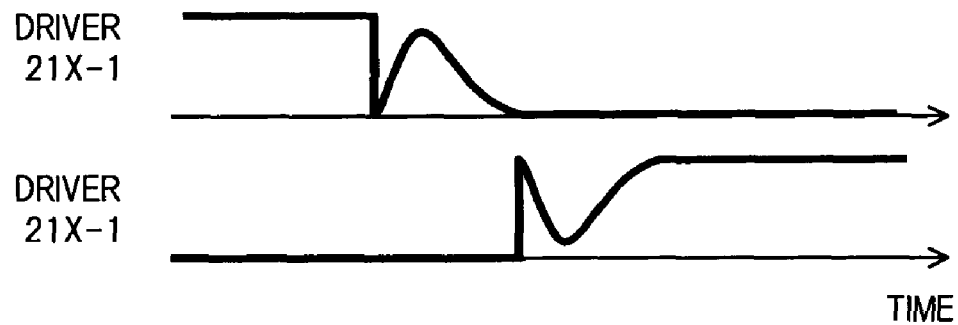
FIG. 13 is a diagram showing one example of a driving waveform at the time of switching a driver in a sixth embodiment of the present invention.
Figure 14:
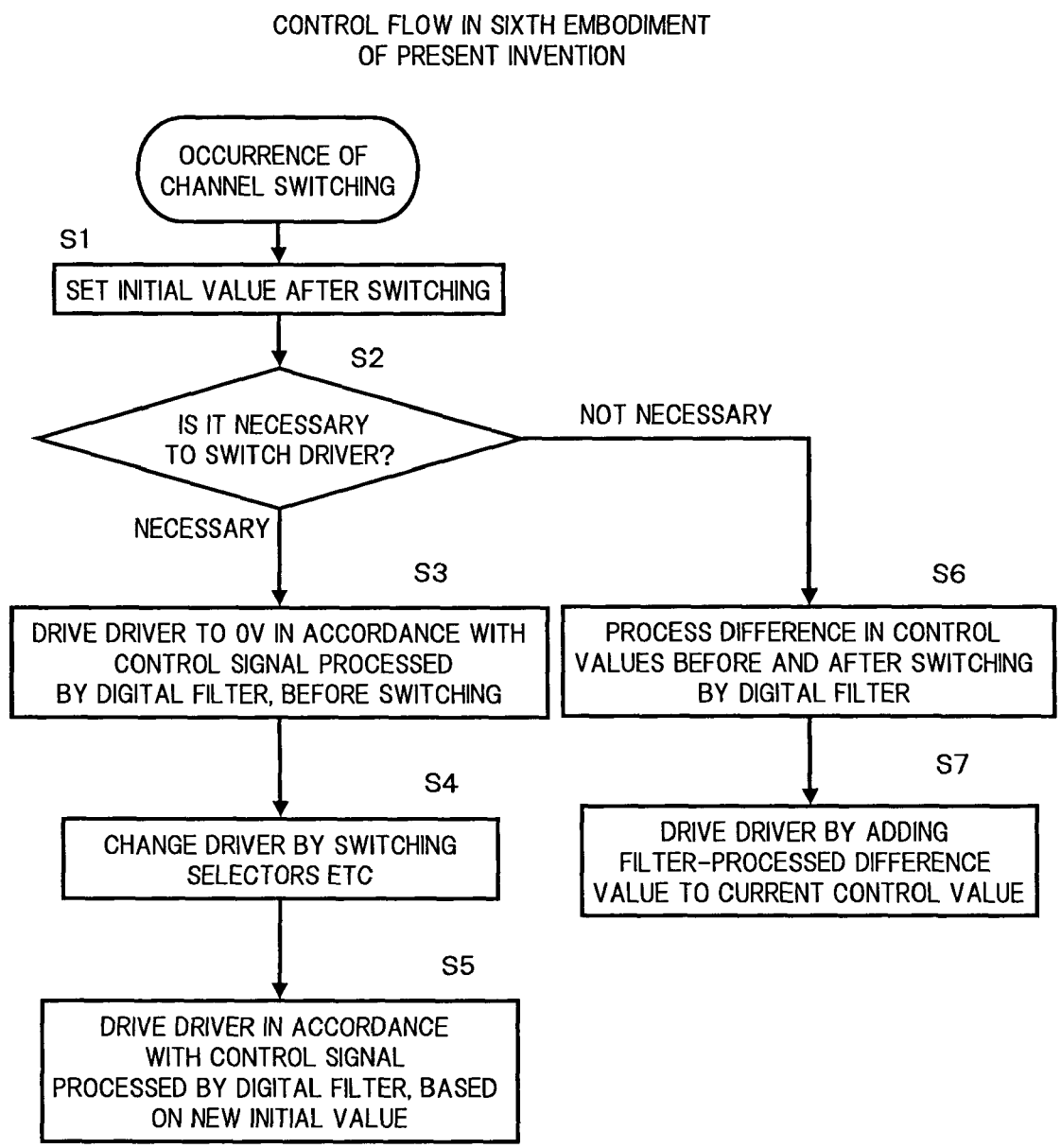
FIG. 14 is a flow chart for explaining a control operation in the sixth embodiment.

FIG. 13 is a diagram showing one example of a driving waveform at the time of switching the driver in the sixth embodiment. FIG. 14 is a flow chart for explaining the control operation at the time of switching the channel in the sixth embodiment. In the example of FIG. 13, the waveforms of the control signals supplied to the respective drivers 22X-1 and 22X-2 are shown, for the case where the driver to be driven is switched from 22X-1 to 22X-2 by switching of the input and output channels.

In the control apparatus in this embodiment, when switching of control for driving the driver 22X-2 instead of the driver 22X-1 that has been driven up to that time is made by switching the channels or the like, in step 1 in FIG. 14 (shown as S1 in the figure and similarly hereunder for other steps), an initial value after switching with respect to the driver 22X-2 is loaded to the comparison control section 13. Then, in step 2, it is judged whether or not switching of the driver is necessary by switching the channels. When it is necessary to switch the driver, control proceeds to step 3, while when it is not necessary to switch the driver, control proceeds to step 6. In step 3, a control signal having a waveform as shown on the upper stage in FIG. 13, that is, a control signal generated by processing a control value for changing the drive voltage from the current value to 0V by the digital filter 31X is supplied to the driver 22X-1 currently being driven, via the D/A converter 21X-1. As a result, the resonance action of the MEMS mirror that occurs when the drive voltage of the driver 22X-1 is changed to 0V is suppressed.

Next, in step 4, the driver to be driven is changed to 22X-2 by switching of the selector 32X or the like. In step 5, a control signal having a waveform as shown on the lower stage in FIG. 13, that is, a control signal processed by the digital filter 31X based on the initial value set in step 1 is supplied to the switched driver 22X-2 via the D/A converter 21X-1. As a result, the resonance action of the MEMS mirror that occurs when the drive voltage of the driver 22X-2 is changed to the initial value is suppressed.

Figure 15:
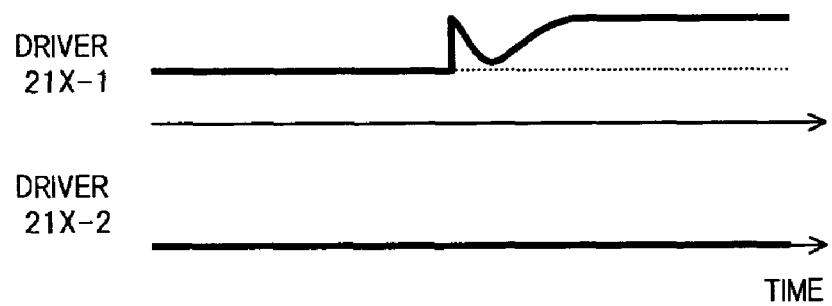
FIG. 15 is a diagram showing one example of a driving waveform, when switching of the driver is not necessary related to the sixth embodiment of the present invention.

When switching of the driver to be driven by switching the channels is not necessary, then in step 6, a difference between the current control value and the initial value after switching is determined, to be processed by the digital filter 31X. Then, in step 7, a value of the difference that has been filter-processed in step 6 is added to the current control value to thereby generate a control signal, and the appropriate driver is successively driven in accordance with the control signal. FIG. 15 shows an example of a driving waveform when the driver 21X-1 is driven before and after the switching of the channels.

Next is a description of a control apparatus of an optical signal exchanger according to a seventh embodiment of the present invention.

In the seventh embodiment, taking into consideration that the residual amplitude of mechanical resonance of the MEMS mirror is in proportion to a tilt angle of the mirror, a control apparatus which suppresses resonance corresponding to the tilt angle will be described,.

Figure 16:
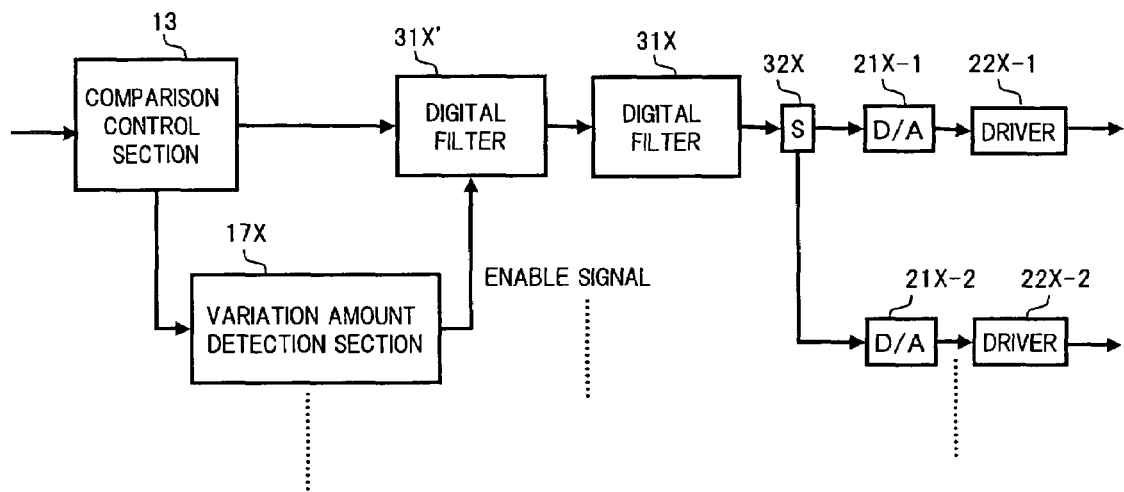
FIG. 16 is a block diagram showing the main configuration of a control apparatus according to a seventh embodiment of the present invention.

FIG. 16 is a block diagram showing the main configuration of the control apparatus according to the seventh embodiment.

In FIG. 16, in the control apparatus in this embodiment, for example, with respect to the configuration in the first embodiment, a variation amount detection section 17X that detects a variation in the digital value of the control signal generated by the comparison control section 13 is provided, so as to control the operation of the digital filter 31X' serially connected to the digital filter 31X in accordance with a detection result of the variation amount detection section 17X. In FIG. 16, only the configuration corresponding to the X axis direction of one MEMS mirror is shown, but it is assumed that the same configuration is provided respectively in the Y axis direction of this MEMS mirror and also in other MEMS mirrors on the MEMS mirror array.

The variation amount detection section 17X detects a variation in the digital value of the control signal output from the comparison control section 13, and generates a signal which enables the filtering operation by the digital filter 31X' when a variation amount exceeds a previously set reference value, and disables the filtering operation by the digital filter 31X' to pass through the control signal when the variation amount is the previously set reference value or less. The digital filter 31X' has the same characteristic as that of the digital filter 31X.

In the control apparatus having such a configuration, when the variation amount detected by the variation amount detection section 17X exceeds the reference value, that is, when an angular control quantity of the MEMS mirror to be controlled is relatively large, the residual amplitude of mechanical resonance of the MEMS mirror is increased. Hence, it is necessary to increase a suppression effect of the resonance component by the digital filter. Therefore, a signal which enables the digital filter 31X' is output from the variation amount detection section 17X to the digital filter 31X', to thereby suppress the resonance component by the digital filters 31X and 31X' serially connected and having a two-stage construction. On the other hand, when the variation amount detected by the variation amount detection section 17X is the reference value or less, opposite to the above case, since the residual amplitude of mechanical resonance of the MEMS mirror to be controlled is small and the influence on the driving control is little, the suppression effect of the resonance component by the digital filter 31X' may be relatively small. Therefore, a signal which disables the digital filter 31X' is output from the variation amount detection section 17X to the digital filter 31X', so that the digital filter 31X' has a through characteristic and the resonance component is suppressed only by the digital filter 31X.

As described above, according to the control apparatus in the seventh embodiment, since the resonance component can be suppressed according to the angular control quantity of the MEMS mirror to be controlled, the control of the optical signal exchanger can be carried out more stably.

In the seventh embodiment, an application example for the configuration in the first embodiment is shown, but it is similarly applicable to other embodiments.

Next is a description of a control apparatus of an optical signal exchanger according to an eighth embodiment of the present invention.

In general, when a filter is inserted on a control loop in the feedback control, the rise time of the driving waveform is delayed, and hence the time required for the feedback control to become stable is prolonged. Therefore, in the eighth embodiment, an application example for realizing high speed feedback control of the MEMS mirror will be described.

Figure 17:
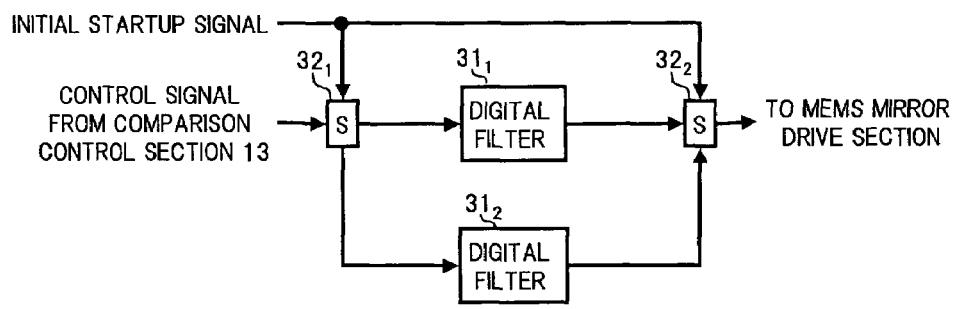
FIG. 17 is a block diagram showing the main configuration of a resonance component removing section and an MEMS mirror drive section in a control apparatus according to an eighth embodiment of the present invention.

FIG. 17 is a diagram showing the main configuration of a resonance component removing section in the control apparatus according to the eighth embodiment.

In FIG. 17, the resonance component removing section of the control apparatus includes two digital filters $31_1$ and $31_2$ having different characteristics, and two selectors $32_1$ and $32_2$ whose connection states are selectively changed over according to the initial startup signal, and the digital filters $31_1$ and $31_2$ are connected in parallel via the selectors $32_1$ and $32_2$. A control signal from the comparison control section 13 is input to the selector $32_1$, and the selector $32_1$ outputs the control signal to either one of the digital filters $31_1$ and $31_2$, according to the initial startup signal, as described later. The selector $32_2$ selectively outputs the control signals, which have passed through the respective digital filters $31_1$ and $31_2$, to the MEMS mirror drive section, by connecting either one of the digital filters $31_1$ and $31_2$ to an output, according to the initial startup signal. The initial startup signal is a signal to be given when the initial value of the driving control is set or updated by switching of the input and output channels.

Figure 18:
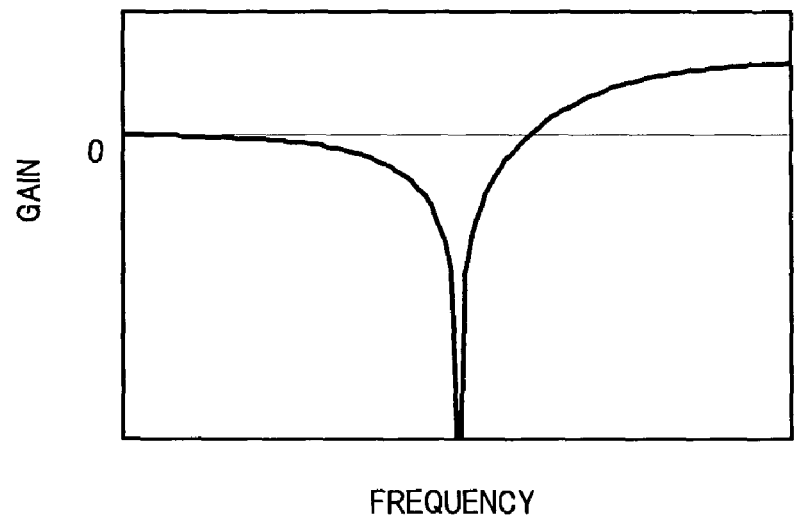
FIG. 18 is a diagram showing one example of AC characteristics of a high-speed digital filter in the eighth embodiment.

The digital filter $31_1$ is a notch filter following the transfer function $G_n(s)$ in the above described equation (2). On the other hand, the digital filter $31_2$ is a notch filter following a transfer function $G_n(s)'$ in the following equation (3):

$$G_n(s) = \frac{k \cdot (s^2 + \omega_n^2)}{s^2 + (1/Q) \cdot (k \cdot \omega_n) \cdot s + (k \cdot \omega_n)^2} \quad (3)$$

where k is a constant. The transfer function $G_n(s)'$ expressed by equation (3) is one obtained by giving a gain to the band on the high frequency side with respect to the transfer function $G_n(s)$ in equation (2). FIG. 18 shows one example of the AC characteristic of the digital filter $31_2$.

Figure 19:
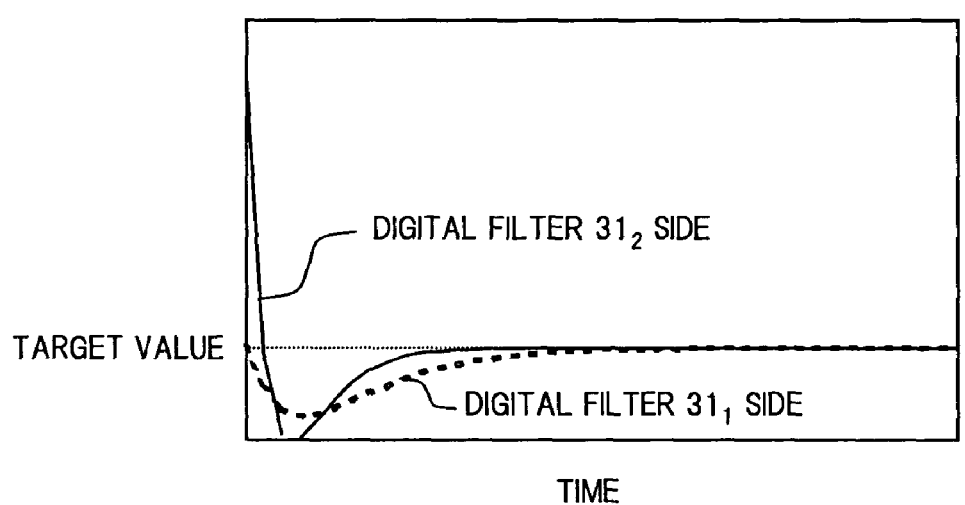
FIG. 19 is a diagram showing one example of response characteristics, when a driver is driven according to a control signal processed in each digital filter in the eighth embodiment.

FIG. 19 is a diagram showing one example of the response characteristic, when a driver is driven in accordance with a control signal processed in each of the digital filters $31_1$ and $31_2$. Furthermore, FIG. 20 is a diagram showing one example of the response characteristic, when a transfer function $G_{MEMS}(s)$ of MEMS mirror the transfer functions $G_n(s)$ and $G_n(s)'$ of the respective digital filters $31_1$ and $31_2$ are combined.

Figure 20:
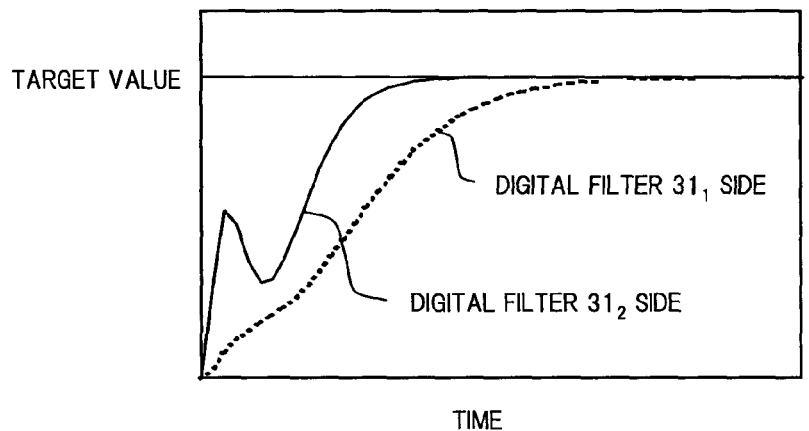
FIG. 20 is a diagram showing one example of the response characteristics, when transfer functions of an MEMS mirror and the digital filter are combined in the eighth embodiment.

As shown in FIG. 19 and FIG. 20, it is seen that the rise time in the response characteristic is speeded up, by using the digital filter $31_2$. Therefore, it becomes possible to shorten the time required for optimization control, by applying the digital filter $31_2$ at the time of feedback control of the tilt angle of the MEMS mirror. However, when the digital filter $31_2$ is applied, as shown in FIG. 19, a large over-shooting occurs in the driving waveform. Therefore, if the digital filter $31_2$ is used when the angular control quantity is increased, as at the time of the initial startup, damage or the like of the MEMS mirror may result, and hence attention should be paid. Therefore, in the present embodiment, the selectors $32_1$ and $32_2$ are switched according to the input of the initial startup signal, to avoid damage or the like of the mirror, by using the digital filter $31_1$ at the time of initial startup when the angular control quantity is large, or to speed up the feedback control by using the digital filter $31_2$ at the time of feedback control when the angular control quantity is relatively small.

According to the eighth embodiment, since the digital filters are switched at the time of initial startup and at the time of feedback control, the high speed feedback control of the MEMS mirror can be realized.

In the eighth embodiment, two digital filters having different characteristics are prepared, to use these respective filters by switching. However, when different characteristics can be obtained by one filter, for example, by changing a constant or the like of the circuit constituting the digital filter, the switching of the filter may be carried out by changing the constant at the time of initial startup and at the time of feedback control.

Figure 21:
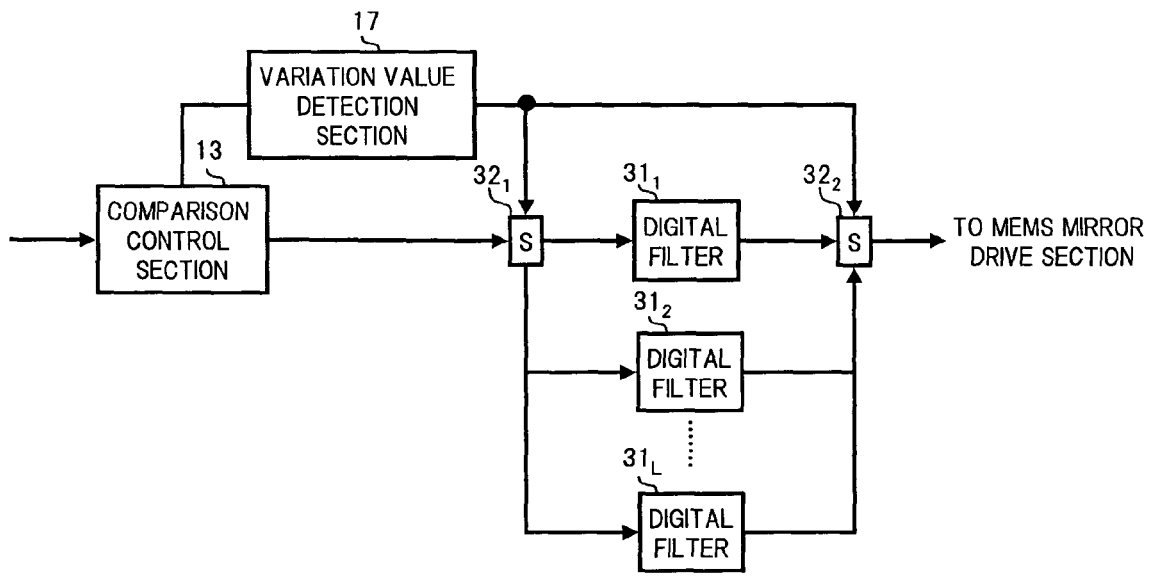
FIG. 21 is a block diagram showing the main configuration of an application example related to the eighth embodiment.

In the eighth embodiment, the filters are switched at the time of initial startup and at the time of feedback control, to speed up the control. However, for example, as shown in FIG. 21, it is possible that a plurality (L in the figure) of digital filters $31_1$ to $31_L$ having different characteristics are connected in parallel via the selectors $32_1$ and $32_2$, and the digital filters $31_1$ to $31_L$ to be applied are switched according to the angular control quantity detected by the variation amount detection section 17. It is assumed that the digital filters $31_1$ to $31_L$ in this case each have a transfer function in which the value of k in equation (3) is changed stepwise. Specifically, when the angular control quantity becomes large as at the time of initial startup, a digital filter having a small k value (k=1) is applied, and as the angular control quantity is decreased, a digital filter having a larger k value is applied. As a result, switching of the digital filter is carried out according to the angular control quantity, also at the time of feedback control, and hence the feedback control of the MEMS mirror can be further speeded up. Here, L-stages digital filters $31_1$ to $31_L$ are prepared, but it is a matter of course that the filter can be switched by changing the constant of the circuit constituting the digital filter, as described above.

Figure 22:
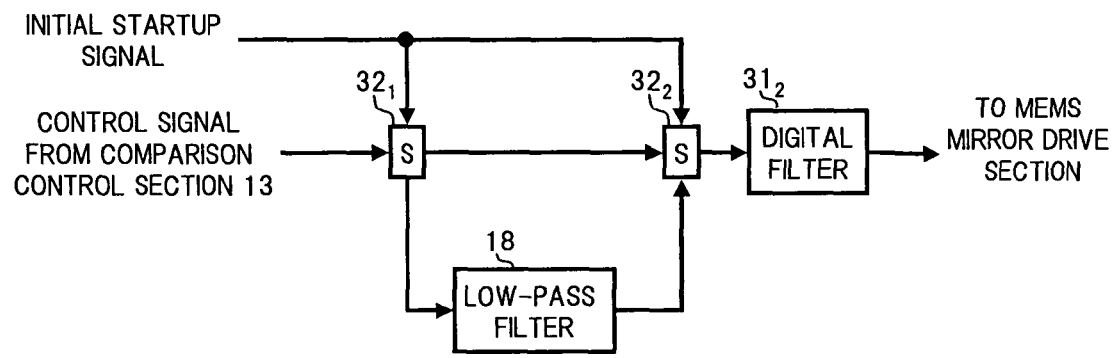
FIG. 22 is a block diagram showing the main configuration of another application example related to the eighth embodiment.
Figure 23:
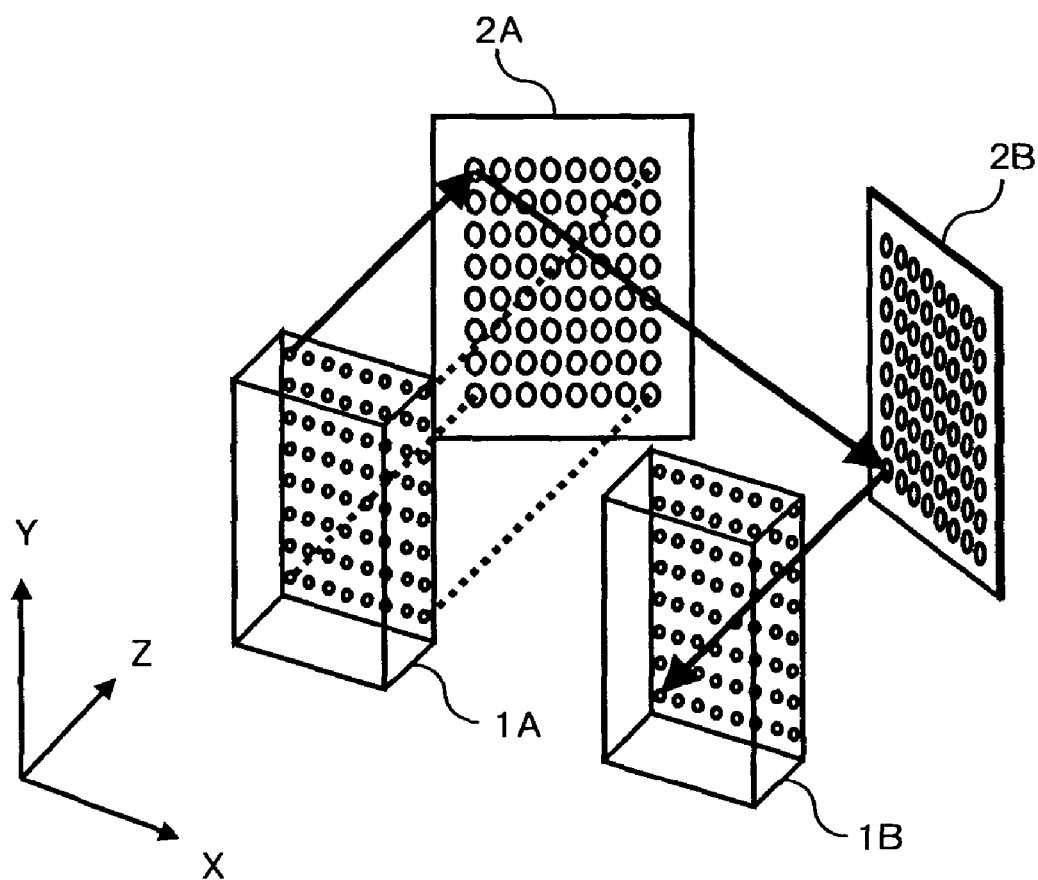
FIG. 23 is a perspective view showing a configuration example of a typical optical signal exchanger of a three-dimensional type.
Figure 24:
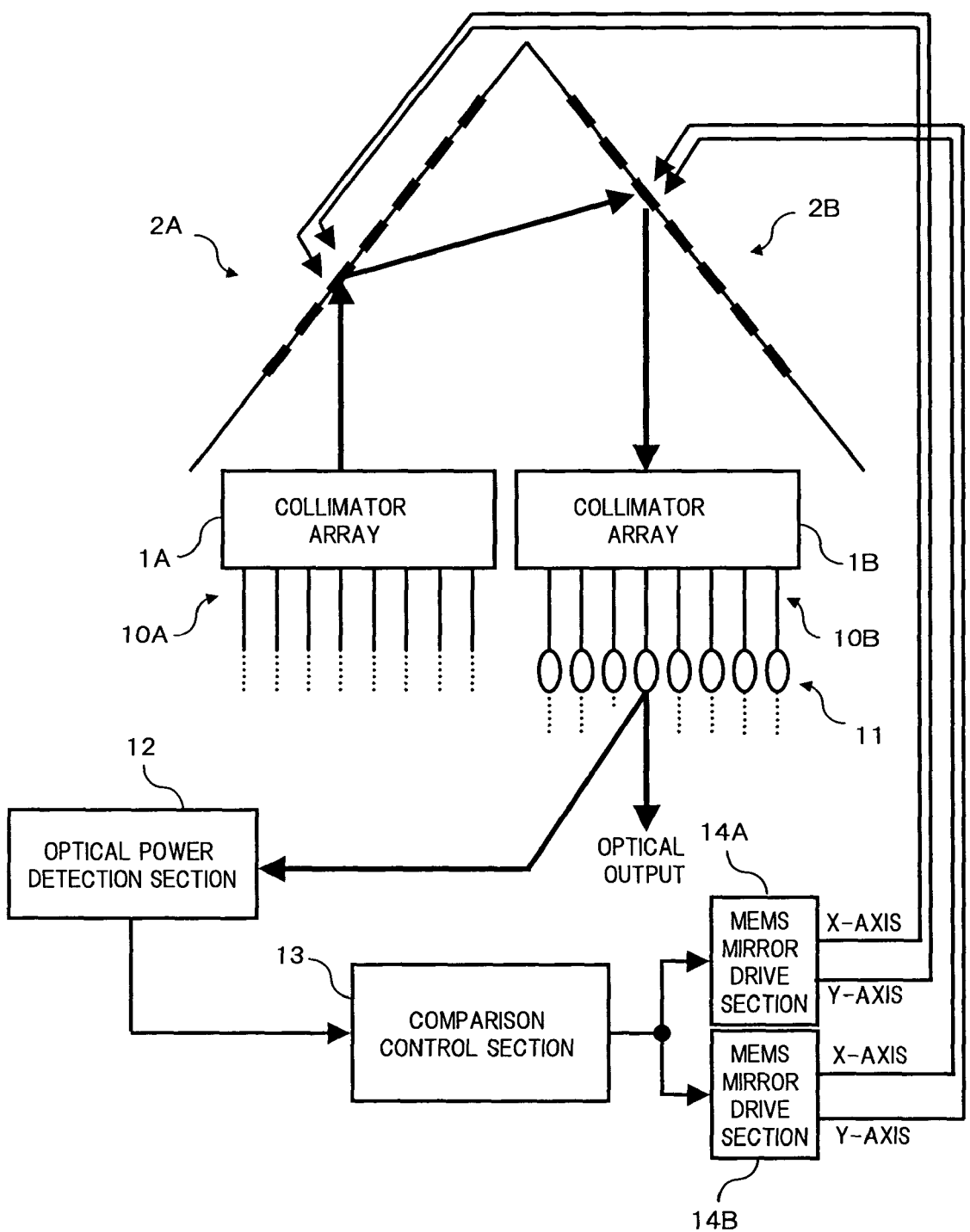
FIG. 24 is a block diagram showing a configuration example of a conventional control apparatus for reducing an optical loss in the optical signal exchanger to a minimum.

In the eighth embodiment, at the time of initial startup, switching to the low-speed digital filter $31_1$ is carried out, taking into consideration over-shooting of the driving waveform by the digital filters $31_2$. However, for example as shown in FIG. 22, a low-pass filter 18 may be connected to the previous stage of the high-speed digital filter $31_2$ via the selectors $32_1$ and $32_2$, and at the time of initial startup, the selectors $32_1$ and $32_2$ select the low-pass filter 18 side so that a control signal passes through the low-pass filter 18 and the digital filter $31_2$ and at the time of feedback control, the selectors $32_1$ and $32_2$ select the through side so that the control signal passes only through the digital filter $31_2$. As a result, the feedback control can be speeded up, while avoiding over-shooting of the driving waveform by the digital filter $31_2$.

What is claimed is:

1. A control apparatus of an optical signal exchanger which includes a first mirror array and a second mirror array, each having a plurality of tilt mirrors arranged on a plane, each tilt mirror having a reflecting surface at an angle which is controllable, an input optical signal being sequentially reflected by said first and second mirror arrays to output at a specific position, at which power of an optical signal output at said specific position is detected, and feedback to control an angle of at least one of the reflecting surfaces of the tilt mirrors of said first and second mirror arrays, which have reflected the input optical signal, said control apparatus comprising:
a resonance component removing section that removes a frequency component corresponding to a mechanical resonance action of changing the angle of any tilt mirror of the first and second mirror array, the frequency component being included in a control signal used for said feedback control, and said resonance component removing section is shared at least by a pair of driving electrodes arranged in an axial direction of any tilt mirror, selectively removing the frequency component corresponding to the mechanical resonance action for at least one of the pair of driving electrodes.

2. A control apparatus of an optical signal exchanger according to claim 1, comprising:
a first mirror drive section that supplies a voltage to either one of a pair of driving electrodes arranged in a first axial direction of a tilt mirror of said first mirror array, and also supplies a voltage to either one of a pair of driving electrodes arranged in a second axial direction different from said first axial direction, to adjust the angle of the reflecting surface of said tilt mirror of said first mirror array;
a second mirror drive section that supplies a voltage to either one of a pair of driving electrodes arranged in a first axial direction of a tilt mirror of said second mirror array, and also supplies a voltage to either one of a pair of driving electrodes arranged in a second axial direction different from said first axial direction, to adjust the angle of the reflecting surface of said tilt mirror of said second mirror array;
an optical power detection section that detects power of the optical signal output from said specific position; and
a comparison control section that generates a control signal for controlling a driving state of a controlled tilt mirror from the first mirror array or the second mirror array, so that an angular displacement of the reflecting surface of said controlled tilt mirror is corrected according to the optical power detected by said optical power detection section,
wherein said resonance component removing section includes:
a first resonance component removing section that removes said resonance frequency component included in the control signal sent from said comparison control section to said first mirror drive section, by using a band-elimination filter that is shared at least for the first axial direction and the second axial direction of a controlled tilt mirror from the first mirror array; and a second resonance component removing section that removes said resonance frequency component included in the control signal sent from said comparison control section to said second mirror drive section, by using a band-elimination filter that is shared at least for each of the first axial direction and the second axial direction of a controlled tilt mirror from the second mirror array.

3. A control apparatus of an optical signal exchanger according to claim 2, wherein said optical power detection section outputs an analog signal indicating the detected power of the optical signal output, to said comparison control section, said comparison control section converts the analog signal from said optical power detection section into a digital signal, and then, according to said digital signal, outputs the control signal for controlling the driving state of the controlled tilt mirror as a digital signal, to said first and second resonance component removing sections, so that an angular displacement of the reflecting surface of said controlled tilt mirror is corrected, and said band-elimination filter of each of said first and second resonance component removing sections which removes said resonance frequency component included in the control signal from said comparison control section, is a digital filter.

4. A control apparatus of an optical signal exchanger according to claim 3, wherein said comparison control section outputs an n-digit even digital value as the control signal corresponding to one driving electrode of a pair of driving electrodes arranged in an axial direction of said controlled tilt mirror, and outputs an n-digit odd digital value as the control signal corresponding to the other driving electrode of the pair of driving electrodes, and each of said first and second resonance component removing sections determines to which one driving electrode of the pair of driving electrodes arranged in the axial direction corresponds said digital value according to the least significant bit of the n-digit even or odd digital value received from the comparison control section.

5. A control apparatus of an optical signal exchanger according to claim 3, wherein said comparison control section outputs an n-bit digital value between 0 to $2^{n-1}$ as the control signal corresponding to one driving electrode of a pair of driving electrodes arranged in an axial direction of said controlled tilt mirror, and outputs an n-bit digital value between $2^{n-1}$ to $2^n$ as the control signal corresponding to the other driving electrode of the pair of driving electrodes, and each of said first and second resonance component removing sections determines to which one driving electrode of the pair of driving electrodes arranged in the axial direction corresponds said digital value according to the most significant bit of the n-bit digital value received from the comparison control section.

6. A control apparatus of an optical signal exchanger according to claim 3, wherein said comparison control section outputs an n-bit digital value between 0 to $2^{n-1}$ as the control signal corresponding to one driving electrode of the pair of driving electrodes arranged in an axial direction of said controlled tilt mirror, and outputs an n-bit digital value between $2^{n-1}$ to $2^n$ as the control signal corresponding to the other driving electrode of the pair of driving electrodes, each of said first and second resonance component removing sections determines a difference between the n-bit digital value received from the comparison control section and a central value $2^{n-1}$, and outputs a digital value corresponding to said difference, as a driving control signal, to each of said first and second mirror drive sections, and each of said first and second mirror drive sections D/A converts the driving control signal from each of said first and second resonance component removing sections to divide the driving control signal into positive and negative analog values, and sets said positive analog value as a control value corresponding to one of said pair of driving electrodes arranged in the axial direction, and said negative analog value as a control value corresponding to the other driving electrode.

7. A control apparatus of an optical signal exchanger according to claim 2, wherein said optical power detection section outputs an analog signal indicating the detected power of the optical signal output, to said comparison control section, said comparison control section converts the analog signal from said optical power detection section into a digital signal, and then, according to said digital signal, outputs the control signal for controlling the driving state of the controlled tilt mirror as a digital signal, to said first and second resonance component removing sections, so that an angular displacement of the reflecting surface of said controlled tilt mirror is corrected, and said band-elimination filter of each of said first and second resonance component removing sections which removes said resonance frequency component included in the control signal from said comparison control section is an analogue filter, said comparison control section outputs an n-bit digital value between 0 to $2^{n-1}$ as the control signal corresponding to one driving electrode of a pair driving electrodes arranged in an axial direction of said controlled tilt mirror, and outputs an n-bit digital value between $2^{n-1}$ to $2^n$ as the control signal corresponding to the other driving electrode of the pair of driving electrodes, each of said first and second resonance component removing sections determines a difference between the n-bit digital value received from the comparison control section and a central value $2^{n-1}$, and outputs said difference, as the driving control signal, to each of said first and second mirror drive sections, and each of said first and second mirror drive sections D/A converts the driving control signal from each of said first and second resonance component removing sections to divide the control signal into positive and negative analog values, and sets said positive analog value as a control value corresponding to one of said driving electrodes arranged in the axial direction, and said negative analog value as a control value corresponding to the other driving electrode.

8. A control apparatus of an optical signal exchanger according to claim 2, wherein said band-elimination filter of said first resonance component removing section which removes said resonance frequency component included in the control signal received from said comparison control section to control said first mirror drive section, is shared by all tilt mirrors on said first mirror array, and said band-elimination filter of said second resonance component removing section which removes said resonance frequency component included in the control signal received from said comparison control section to control said second mirror drive section, is shared by all tilt mirrors on said second mirror array.

9. A control apparatus of an optical signal exchanger according to claim 1,
wherein said resonance component removing section is shared by respective pairs of driving electrodes arranged in a first respective axial direction of all tilt mirrors on said first and second mirror arrays, and by respective pairs of driving electrodes arranged in a second respective axial direction different from said first axial direction.

10. A control apparatus of an optical signal exchanger according to claim 1,
wherein said resonance component removing section eliminates any component included in the control signal within a bandwidth corresponding to a variation in the frequency of the mechanical resonance.

11. A control apparatus of an optical signal exchanger according to claim 10,
wherein said resonance component removing section comprises a circuit in which a plurality of band-elimination filters having a same characteristic are serially connected.

12. A control apparatus of an optical signal exchanger according to claim 1,
wherein said resonance component removing section removes the frequency component corresponding to the mechanical resonance action included in said control signal, using a band-elimination filter of Butterworth type.

13. A control apparatus of an optical signal exchanger according to claim 1,
wherein said resonance component removing section removes the frequency component corresponding to the mechanical resonance action included in said control signal, using a band-elimination filter of Chebyshev type.

14. A control apparatus of an optical signal exchanger according to claim 1,
wherein said resonance component removing section removes the frequency component corresponding to the mechanical resonance included in said control signal, using a band-elimination filter of elliptic function type.

15. A control apparatus of an optical signal exchanger according to claim 1,
wherein said resonance component removing section removes the frequency component corresponding to the mechanical resonance included in said control signal, using a low-pass filter having a cutoff frequency corresponding to the frequency corresponding to the mechanical resonance of said tilt mirror.

16. A control apparatus of an optical signal exchanger according to claim 2,
wherein said comparison control section supplies a non-drive control signal for setting one driving electrode of the pair of driving electrodes in a non-driven state, to a corresponding mirror drive section via said corresponding resonance component removing section, when the controlled tilt mirror has the angle adjusted via the other driving electrode, after having the angle adjusted via the one driving electrode of the pair of driving electrodes arranged in the axial direction of said tilt mirror and then supplies a drive control signal for setting the other driving electrode in a driven state to the corresponding mirror drive section via said corresponding resonance component removing section.

17. A control apparatus of an optical signal exchanger according to claim 1,
wherein said resonance component removing section includes a plurality of band-elimination filters having different transfer functions from each other, and selects at least one of said plurality of band-elimination filters according to a drive voltage applied to a driving electrode of a tilt mirror, to thereby remove the frequency component of the mechanical resonance included in said control signal.

18. A control apparatus of an optical signal exchanger according to claim 1,
wherein said resonance component removing section includes a plurality of band-elimination filters having different transfer functions, and selects one of said plurality of band-elimination filters, according to a time of initial startup and a time of feedback control.

19. A control apparatus of an optical signal exchanger according to claim 1,
wherein resonance component removing section includes a band-elimination filter whose transfer function is changed, for different shared configurations, and said resonance component removing section changes the transfer function of said band-elimination filter according to a drive voltage to be applied to a driving electrode of any tilt mirror, to thereby remove the frequency component of the mechanical resonance included in said control signal.

20. A control apparatus of an optical signal exchanger according to claim 19,
wherein the band-elimination filter of said resonance component removing section has a transfer function that can be changed, and said resonance component removing section changes the transfer function of said band-elimination filter, according to a time of initial startup and a time of feedback control.

21. A control method of an optical signal exchanger which includes a first mirror array and a second mirror array, each having a plurality of tilt mirrors arranged on a plane, each tilt mirror having a reflecting surface at an angle which is controllable, an input optical signal being sequentially reflected by said first and second mirror arrays to output at a specific position, at which power of an optical signal output at said specific position is detected, and feedback to control the angle of at least one of the reflecting surfaces of the tilt mirrors of said first and second mirror array, which have reflected the input optical signal on said first and second mirror arrays, comprising:
removing a frequency component corresponding to a mechanical resonance action included in a control signal used for said feedback control, which is removed for at least one of a pair of driving electrodes arranged in a coaxial direction of said tilt mirror using a same frequency removing device.

22. A control apparatus of an optical signal exchanger which includes a first mirror array and a second mirror array, each having a plurality of tilt mirrors arranged on a plane, each tilt mirror having a reflecting surface at an angle, and the first and second mirror arrays sequentially reflecting an input optical signal to output at a specific position, where power of an output optical signal, and the angle of at least one of the reflecting surfaces of the tilt mirrors that reflected the input signal, being feedback controlled based on a detection result, by providing a feedback control signal to one of a pair of driving electrodes that change the angle of the at least one of the reflecting surfaces of the tilt mirrors, the control apparatus comprising:

a resonance component removing section that selectively removes a frequency component corresponding to a mechanical resonance from the feedback control signal, provided to the one of the pair of driving electrodes, the resonance component removing section being shared by driving electrodes of the pair of driving electrodes which are arranged in a coaxial direction of said tilt mirror.

* * * * *

UNITED STATES PATENT AND TRADEMARK OFFICE
CERTIFICATE OF CORRECTION

| | |
|---|---|
| PATENT NO. | : 7,398,019 B2 |
| APPLICATION NO. | : 10/643895 |
| DATED | : July 8, 2008 |
| INVENTOR(S) | : Yuji Tochio et al. |

It is certified that error appears in the above-identified patent and that said Letters Patent is hereby corrected as shown below:

Column 20, Line 1, change "2n\" to --$2^n$--.

Column 21, Line 46, after "resonance" insert --action--.

Column 21, Line 52, after "resonance" insert --action--.

Column 22, Line 30, after "resonance" insert --action--.

Signed and Sealed this

Twenty-first Day of October, 2008

JON W. DUDAS
*Director of the United States Patent and Trademark Office*